United States Patent
Yonezawa

(10) Patent No.: US 6,542,191 B1
(45) Date of Patent: *Apr. 1, 2003

(54) IMAGE DISPLAY APPARATUS, CAMERA CONTROL APPARATUS AND METHOD

(75) Inventor: Hiroki Yonezawa, Tokyo (JP)

(73) Assignee: Canon Kabushiki Kaisha, Tokyo (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/839,828

(22) Filed: Apr. 22, 1997

(30) Foreign Application Priority Data

Apr. 23, 1996 (JP) .............................. 8-101227

(51) Int. Cl.[7] .............................................. H04N 5/222
(52) U.S. Cl. ........................... 348/333.01; 348/207.99; 348/211.13; 348/143; 348/159
(58) Field of Search .................. 348/15, 143, 153, 348/159, 217, 211, 333, 334, 14.05, 211.99, 211.1, 211.6, 211.11, 211.12, 211.13, 207.99, 207.1, 333.01, 333.02

(56) References Cited

U.S. PATENT DOCUMENTS

| | | | | |
|---|---|---|---|---|
| 4,992,866 A | * | 2/1991 | Morgan ........................ | 358/108 |
| 5,430,511 A | * | 7/1995 | Paff et al. ...................... | 354/81 |
| 5,479,206 A | * | 12/1995 | Ueno et al. ................... | 348/211 |
| 5,745,748 A | * | 4/1998 | Ahmad et al. ............... | 395/610 |
| 5,793,367 A | * | 8/1998 | Taguchi ........................ | 345/330 |
| 5,933,143 A | * | 8/1999 | Kobayashi ................... | 345/346 |
| 6,037,936 A | * | 3/2000 | Eilenby et al. .............. | 348/211 |
| 6,208,376 B1 | * | 3/2001 | Tanaka et al. ............... | 348/153 |
| 6,208,379 B1 | * | 3/2001 | Oya et al. .................... | 348/213 |
| 6,266,082 B1 | * | 7/2001 | Yonezawa et al. ........... | 348/159 |

FOREIGN PATENT DOCUMENTS

| | | | |
|---|---|---|---|
| EP | 0 513 601 A1 | 11/1992 | ......... G08B/13/196 |
| EP | 0 690 628 A1 | 1/1996 | ............ H04N/7/18 |

OTHER PUBLICATIONS

European Search Report, Mar. 27, 1998.
Gaver W W et al. "A Virtual Window on Media Space" May 7–11, 1995, pp. 257–264.
U.S. patent application No. 08/563,703, filed on Nov. 28, 1995.
U.S. patent application No. 08/615,876, filed on Mar. 14, 1996.

* cited by examiner

Primary Examiner—Wendy R. Garber
Assistant Examiner—Jacqueline Wilson
(74) Attorney, Agent, or Firm—Morgan & Finnegan, L.L.P.

(57) ABSTRACT

An image display apparatus capable of selecting an arbitrary camera from a plurality of cameras connected via a network and displaying an image sensed by the selected camera. The image display apparatus includes a first memory unit for storing predetermined map data, a map display unit for displaying a map on a screen based on the map data stored in the first memory unit, a symbol display unit for superimposing a camera symbol indicative of the camera at an arbitrary position of the map displayed on the screen, and a second memory unit for storing the camera symbol in association with the position.

7 Claims, 31 Drawing Sheets

FIG.5
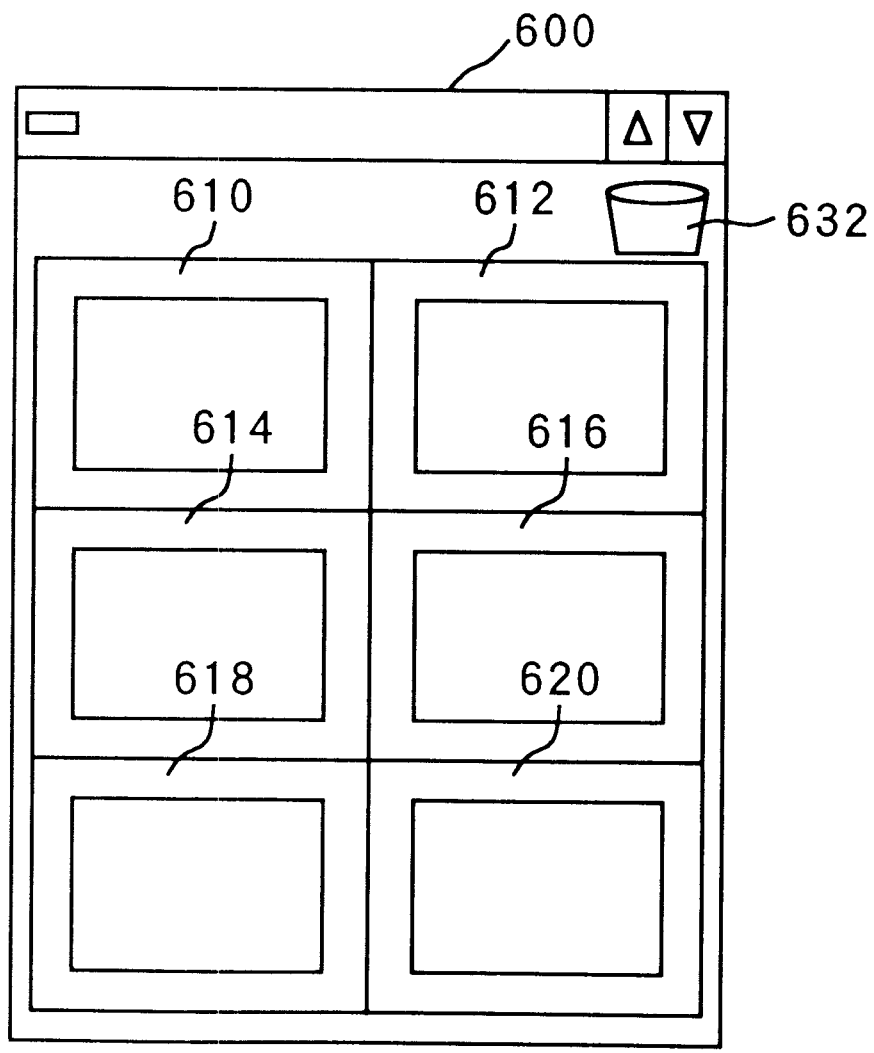
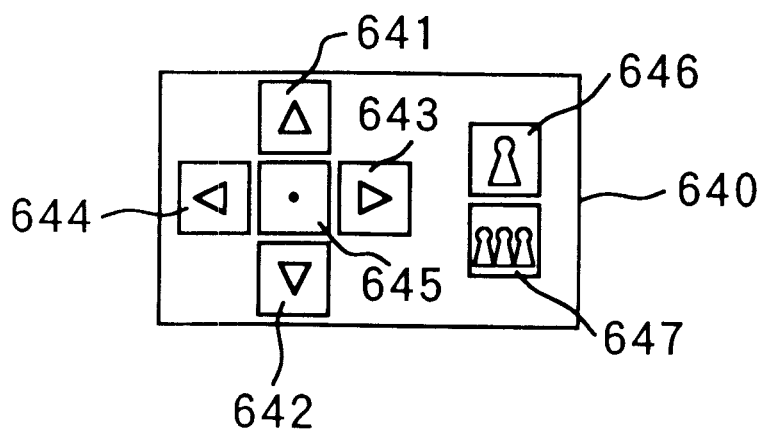

FIG.31

```
+
FLOOR1  c:\map\image\map1.bmp  F1 ↻
FLOOR2  c:\map\image\map2.bmp  F2 ↻
          ......
$
FLOOR1  CAMERA-SERVER1    100,100   95  0 0  CAMERA1   VCC ↻
FLOOR1  CAMERA-SERVER2    200,100  120  1 1  CAMERA2   VCC ↻
FLOOR1  CAMERA-SERVER2    300,100  200  1 2  CAMERA3   VCC ↻
          ......                      ......
FLOOR2  CAMERA-SERVER20   150,200  150  0 0  CAMERA20  OTHER ↻

[EOF]
```

{ MAP DESCRIPTION

{ CAMERA DESCRIPTION

IMAGE DISPLAY APPARATUS, CAMERA CONTROL APPARATUS AND METHOD

BACKGROUND OF THE INVENTION

Present invention relates to an image display apparatus and a camera control apparatus capable of performing control operation of a camera located in a remote place.

As an example of an apparatus utilizing such image display apparatus and camera control apparatus, a monitoring apparatus comprising a plurality of video cameras, an image combine device used for combining analog images sensed by the video cameras, and a device called "switcher" which is capable of selecting an image (sensed by the video camera), has been provided. The monitoring apparatus is mainly utilized in a building relatively small and is called a local monitoring system. While the local monitoring system is available, a remote monitoring system is also available, utilizing a digital network e.g. LAN, ISDN or the like for an image transmission path instead of using analog cables, thereby enabling great extension of a transmission path.

Moreover, the recent monitoring system realizes image display and system control with the use of Graphical User Interface (GUI) by utilizing a personal computer as a monitoring terminal. By utilizing GUI in the monitoring apparatus, operation becomes easy for a user who is not familiar with the apparatus.

However, in the conventional system of this type, an operator has to select a video camera to be controlled by designating a camera ID or a camera name. Therefore, there has been a demand for a technique to display arrangement of video cameras so that an operator can immediately grasp the camera condition, and a technique which improves the operability of the video cameras.

SUMMARY OF THE INVENTION

The present invention has been made in consideration of the above situation, and has as its first object to provide an apparatus which can display arrangement of video cameras on a map with easy operation.

The second object of the present invention is to provide an apparatus which improves operability of a video camera displayed on the map.

In order to attain the above objects, the present invention provides, as its first construction, an image display apparatus capable of selecting an arbitrary camera from a plurality of cameras connected via a network and displaying an image, comprising: first memory for storing predetermined map data; map display means for displaying a map on a screen based on the map data stored in the first memory; symbol display means for superimposing a camera symbol indicative of the camera at an arbitrary position of the map displayed on the screen; and second memory for storing the camera symbol in association with the position.

Furthermore, in accordance with the first construction of the present invention as described above, the present invention further comprises, as its second construction, input means for reading a map, wherein the input means converts the read map to digital data, and the first memory stores the map data converted by the input means.

Furthermore, in accordance with the first construction of the present invention as described above, the present invention further comprises, as its third construction, map generate means for generating a map, wherein the map generate means converts a generated map to digital data, and the first memory stores the map data converted by the map generate means.

In addition, in order to attain the above objects, the present invention provides, as its fourth construction, a camera control apparatus capable of selecting a controllable camera from a plurality of cameras connected via a network and controlling the camera, comprising: first memory for storing predetermined map data; map display means for displaying a map on a screen based on the map data stored in the first memory; symbol display means for superimposing a camera symbol indicative of the camera at an arbitrary position of the map displayed on the screen; and second memory for storing the camera symbol in association with the position.

In accordance with the fourth construction of the present invention as described above, the present invention is characterized in that the symbol display means displays a possible range of panning operation of a camera which corresponds to the superimposed camera symbol, in association with a corresponding camera symbol.

Furthermore, in accordance with the above construction of the present invention as described above, the present invention is characterized in that the second memory stores the possible range of panning operation of the camera in association with the corresponding camera symbol.

Furthermore, in accordance with the fourth construction of the present invention as described above, the present invention is characterized in that the symbol display means is capable of changing a direction of a camera corresponding to the camera symbol by rotating the camera symbol.

Furthermore, in accordance with the above construction of the present invention as described above, the present invention is characterized in that the second memory stores the direction of the camera symbol in association with the corresponding camera symbol.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 5 shows an image display window 600 according to the present embodiment;

FIGS. 19A–19C show the main pull-down menu of the map editor, wherein FIG. 19A shows a file menu; FIG. 19B, a map menu; and FIG. 19C, a camera menu;

FIG. 31 is an explanatory view showing contents of a map file according to the present embodiment.

DETAILED DESCRIPTION OF THE PREFERRED EMBODIMENTS

Preferred embodiments of the present invention will be described in detail in accordance with the accompanying drawings.

Figure 1:
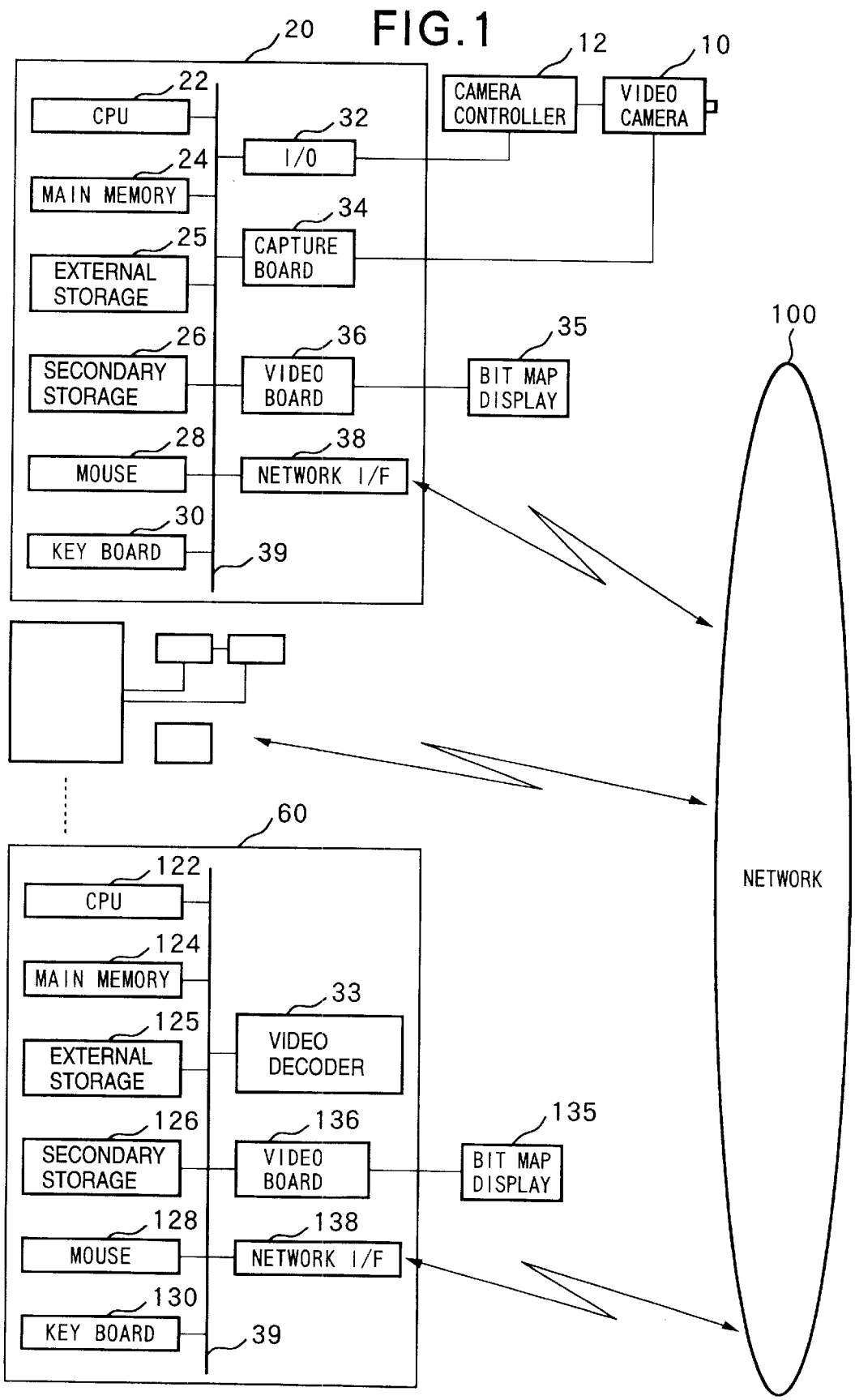
FIG. 1 is a block diagram showing an image transmission terminal and a monitoring terminal according to the first embodiment.

FIG. 1 is a block diagram of the entire system including an image transmission terminal and a monitoring terminal. The device construction of the image transmitting side according to the present invention includes: a video camera 10, serving as an image signal generation apparatus; a camera controller 12 which controls the video camera 10; an image transmission terminal 20; and a bit map display 35.

The camera controller 12 directly controls pan, tilt, zoom, focus, diaphragm of the video camera 10 (hereinafter referred to as the camera) in accordance with an external control signal sent by the image transmission terminal 20. The external control signal is inputted via an interface which is provided by e.g. RS-232C. In case of the camera 10 not having the function of being controlled with respect to its panning or tilting, the camera controller 12 is not necessary. In addition, the camera controller 12 may control turning on and off of the power of the camera 10.

The image transmission terminal 20 is a computer which controls the camera 10 connected to the camera controller 12 by sending control codes to the camera controller 12, and transmits image data obtained by the camera 10 to network via a network interface 38. A work station (WS) or a personal computer (PC) or the like may be used as the above described computer.

The image transmission terminal 20 in the present embodiment will be described next.

The image transmission terminal 20 is constructed with a CPU 22 which controls the entire terminal, a main memory 24, a detachable external storage 25 e.g. floppy disk, CD ROM or the like, a secondary storage 26 such as hard disk, a mouse 28 serving as a pointing device, a keyboard 30, I/O board 32, a video capture board 34, a video board 36, the network interface 38, and a system bus 39 interconnecting each of the above described devices from the CPU 20 to the network interface 38.

In the above described construction, the pointing device is not limited to the mouse, but other devices, e.g. a touch panel on the display 35, may be provided.

It is preferable to have a construction such that software for the present system is read out of the medium of the external storage 25 or the network interface 38 and stored in the secondary storage 26.

The I/O board 32, connected to the camera controller 12, transmits and receives a camera control signal. Herein, the camera controller 12 may be incorporated in the image transmission terminal 20. Furthermore, the video capture board 34 captures a video output signal VD of the camera 10. The video output signal VD may be either an analog signal, e.g. NTSC, or a digital signal. However, in the case of an analog signal, it is necessary to include a function for A/D conversion. The video capture board 34 does not need to include a data compression function, however, if no compression function is included, it is preferable to perform data compression by software. A captured image is sent to the network interface 38 and a monitoring terminal 60 via network as compressed data. The captured image is also outputted from the capture board 34 to the video board 36 via the system bus 39, and is displayed in an arbitrary position of the bit map display 35. The display position is controlled by the CPU 22 which sends an instruction of a display position or a display area to the video board 36.

Note that the image transmission terminal 20 outputs an instruction signal to the camera controller 12 in accordance with the instruction sent by the monitoring terminal 60 on the network, in order to control the angles (pan angle, tilt angle, zoom value) of the camera 10. After the instruction signal is outputted, the image transmission terminal 20 receives information regarding the current camera condition from the camera controller 12. Then, the condition information is transmitted to the monitoring terminal 60 in a predetermined format along with the captured image data.

By having the above described construction, the image transmission terminal 20 transmits an image to the monitoring terminal 60 located in a remote place via the network 100, and receives a camera control signal from the monitoring terminal to perform camera control.

The monitoring terminal 60 (image receive terminal) will be described next with reference to FIG. 1 showing the brief construction thereof.

The monitoring terminal 60 sends a control signal of the camera 10 to the image transmission terminal 20. The image transmission terminal 20 controls the video camera in accordance with the controlled signal as described above, and a resultant condition of the camera 10 is returned to the monitoring terminal 60 via the network 100. The monitoring terminal 60 displays the condition information of the camera 10 on a display apparatus, such as a bit map display 135. In addition, the monitoring terminal 60 receives image data sent by the image transmission terminal 20, decompresses the compressed and encoded data utilizing software and displays the image data on the display apparatus in real-time. As can be seen from FIG. 1, the monitoring terminal 60 has the same construction as that of the image transmission terminal 20 in FIG. 1, except the camera 10, camera controller 12 and capture board 34. Components having the same functions are referred by reference numerals having the same last two-digit. It is not necessary to exclude those components (camera 10, camera controller 12 and capture board 34). If the capability of CPU 22 is poor and decompression takes time, extended hardware having a function for decoding and decompressing data may be added.

Note that in the present embodiment, the image transmission terminal 20 and monitoring terminal 60 are provided separately. However, it is more realistic for a single terminal to have the both functions to serve as an image transmission terminal and a monitoring terminal.

In the foregoing construction, image data is received from the image transmission terminal 20 located in a remote place via the network 100, and is displayed in an arbitrary position on the bit map display 135, i.e., the monitoring display apparatus. Then video camera control codes according to an instruction for controlling the camera 10, inputted by an operator with a keyboard 130 or a mouse 128, are transmitted to the image transmission terminal 20.

Figure 2:
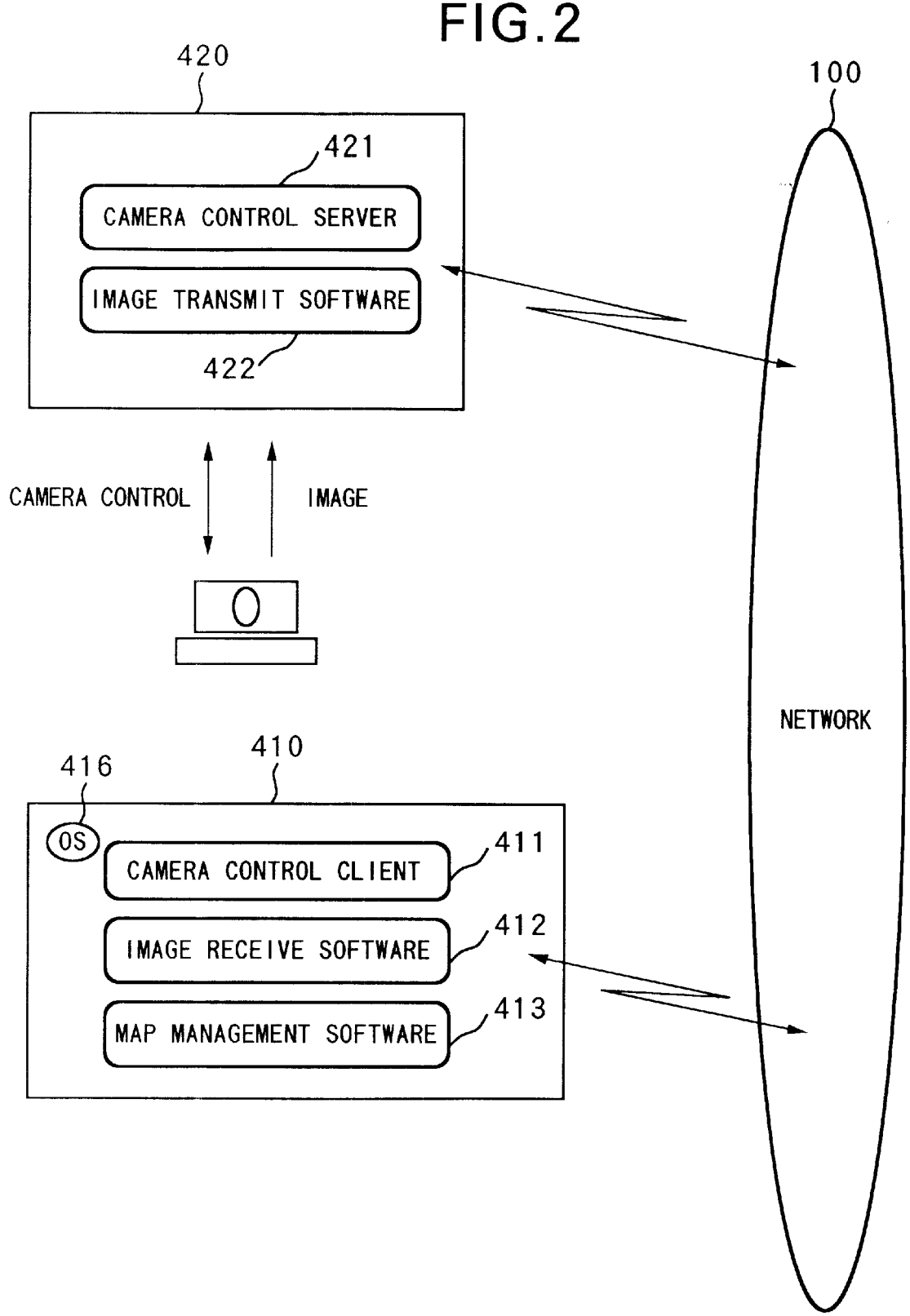
FIG. 2 is a block diagram showing software according to the first embodiment.

FIG. 2 is a block diagram showing software according to the first embodiment. In the monitoring terminal 60 shown in FIG. 1, software 410 is installed; and in the image transmission terminal 20 shown in FIG. 1, software 420 is installed. By virtue of the software 410 and 420, a plurality of terminals 20 and 60 are mutually operable via the network 100.

Figure 6:
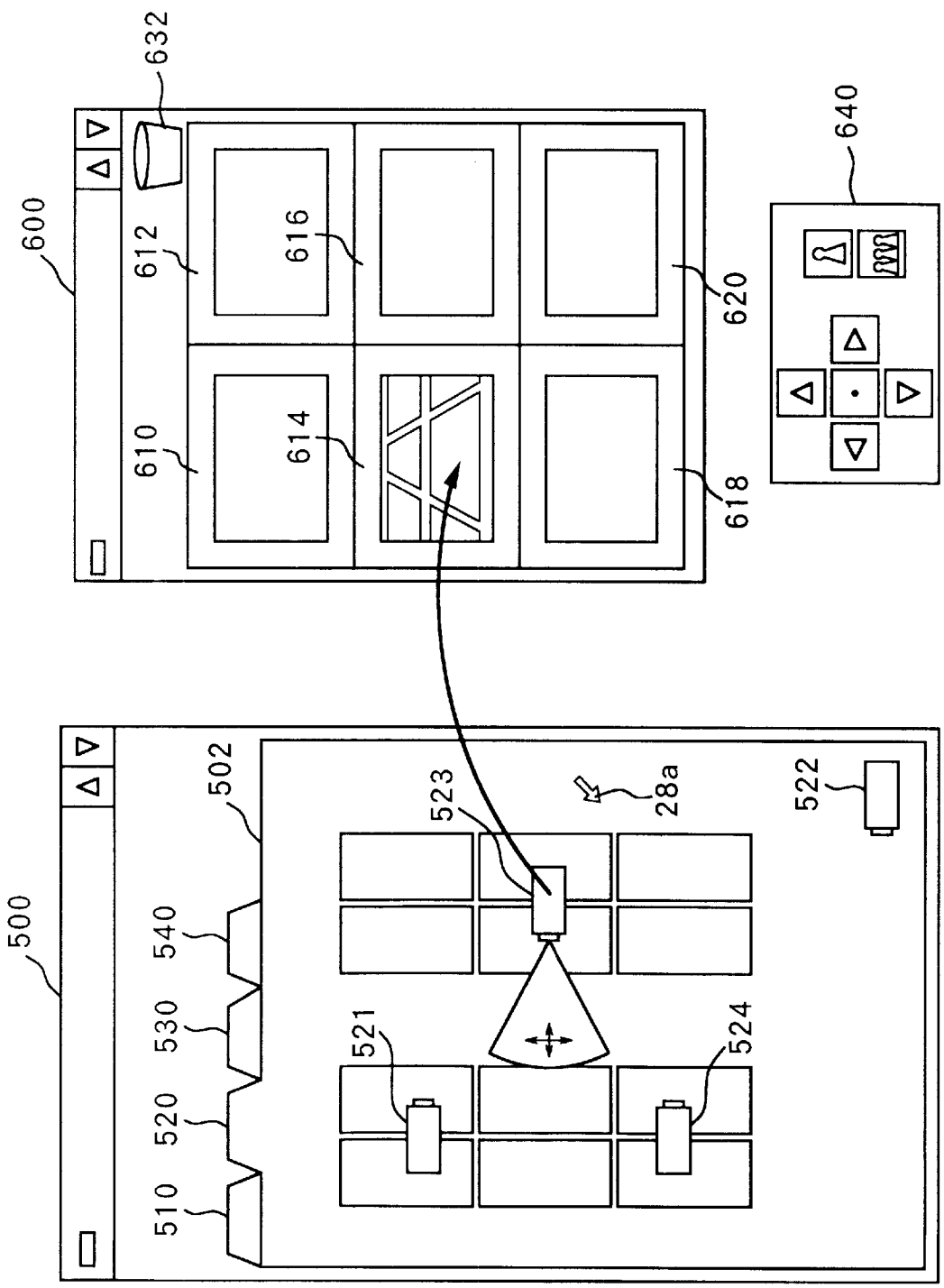
FIG. 6 shows dragging and dropping operation (D&D operation)

The software 410 installed in the monitoring terminal 60 includes: a camera control client 411 which remotely controls cameras 10 respectively connected to the image transmission terminal 20 on the network 100; an image receive software 412 which decodes, decompresses and displays a packet of image data sent from the image transmission terminal 20; and a map management software 413 which graphically displays the position, panning, and zooming of a camera by utilizing the map, camera symbol and the scope display as shown in FIG. 6 in accordance with a map file (stored in the secondary storage 126 or in the external storage 125) to be described later, and which has the GUI for performing camera control. The map management software 413 serves as map display means and symbol display means; more specifically, CPU 22 performs the display processing in accordance with the software 413.

In addition, the map management software 413 has a function to update display of camera icons on the map (to be described later) in accordance with the condition information of the camera 10 received from the image transmission terminal 20.

The image receive software 412 serves as main software for managing the cameras 10 of all the image transmission terminals 20 connected to the network 100. The image receive software 412 has information such as camera names of each of the cameras 10, host names of the image transmission terminals (computer) 20 to which the cameras 10 are connected, camera conditions (pan, tilt, zoom), information regarding the cameras 10 such as whether or not it is controllable, and current conditions e.g., a current-controlled camera or a camera whose image is currently displayed or the like. These information are stored in the main memory 124 serving as secondary storage means. These information are also shared by the camera control client 411 and map management software 413 and utilized for changing display conditions of camera symbols or the like.

The software 420 installed in the image transmission terminal 20 consists of a camera control server 421 which controls conditions of the cameras 10 such as pan/tilt, zoom, white balance or the like of the cameras 10 connected to the image transmission terminal 20, and an image transmit software 422 which stores image data outputted by the cameras 10 and cooperates with the image receive software 412.

Figure 3:
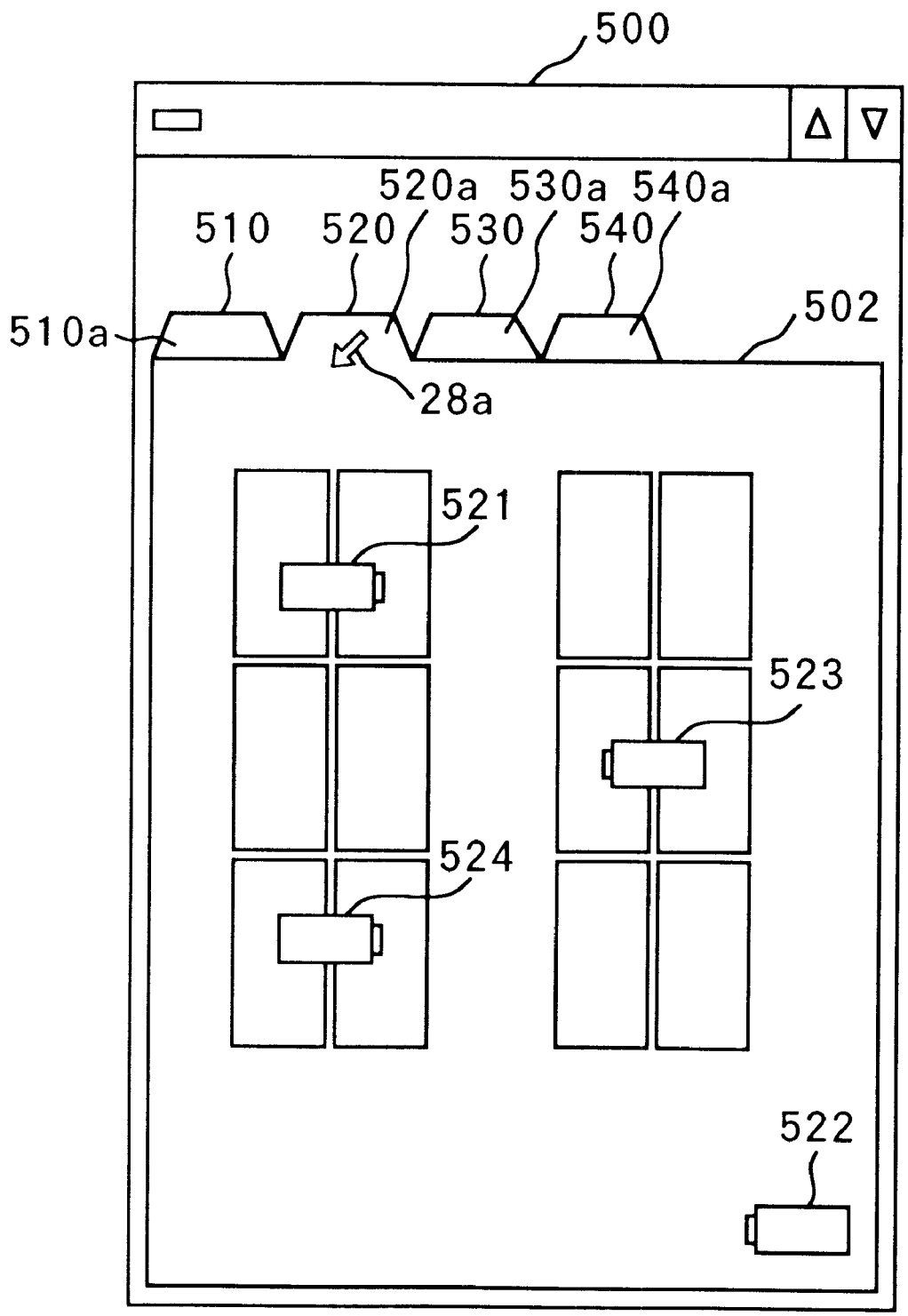
FIG. 3 shows an example on a display screen according to the present embodiment.
Figure 4:
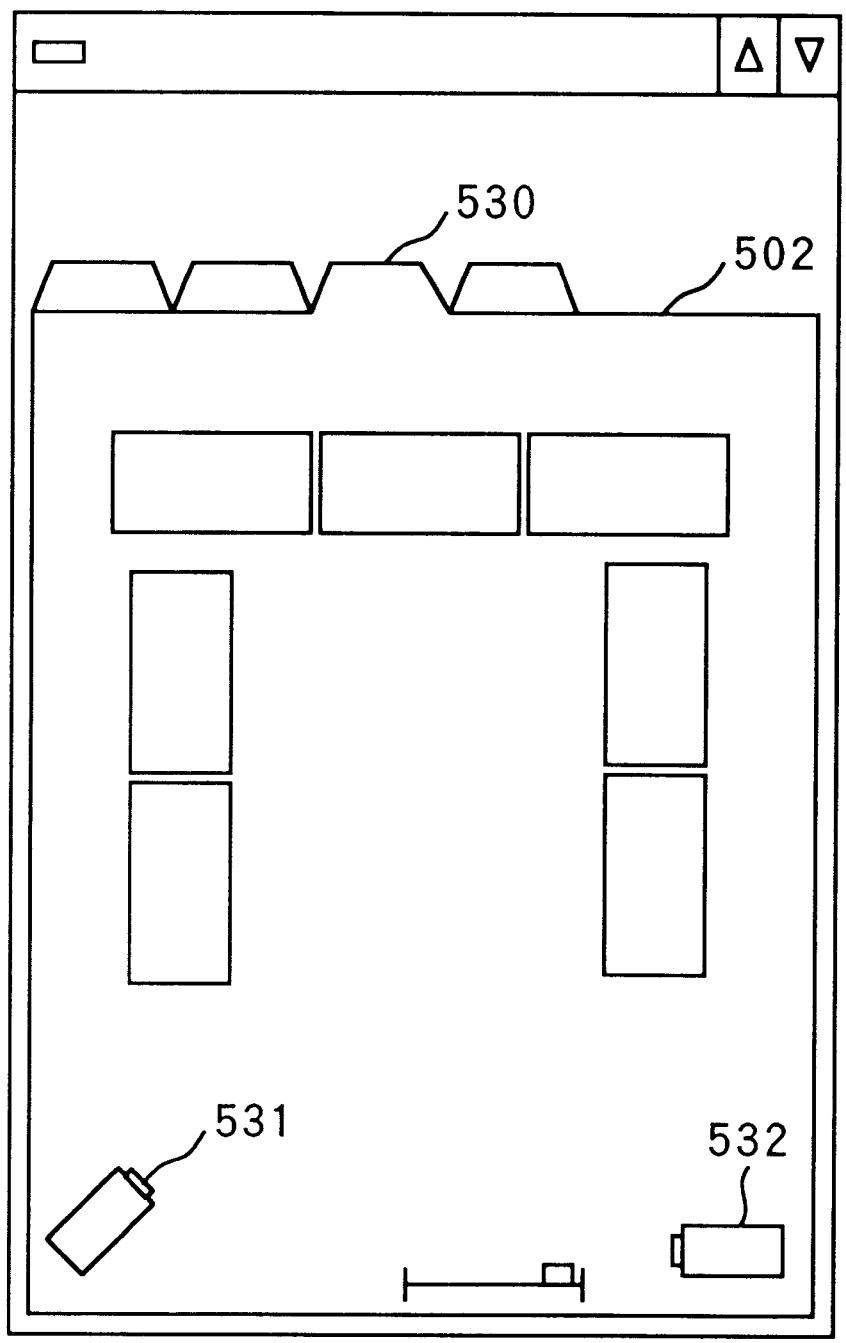
FIG. 4 shows an example on a display screen where a map is switched to map 530.

FIG. 3 shows a screen, selected from a map file to be described later, displayed on the bit map display 135 of the monitoring terminal 60. Reference numeral 500 denotes a map window where a plurality of maps 510, 520, 530 and 540 are managed. The maps 510, 520, 530 and 540 respectively indicate a layout of an office, a store or a storage. The number of stored maps depends upon the capability of the system, thus no limitation is set herein. Each of the maps 510, 520, 530 and 540 has tags 510a, 520a, 530a and 540a respectively. When a cursor 28a is positioned on any of the tags 510a, 520a, 530a, or 540a and clicked with the mouse 28, the map corresponding to the selected tag is displayed in the map display area 502. The camera symbols (camera icons) arranged on the map are also displayed. In FIG. 3, the map 520 is selected from the maps 510–540 and displayed in the map display area 502. Camera icons 521, 522, 523, 524 arranged on the map 520 are also displayed. Herein, if the tag 530a of the map 530 is selected, the map 530 is displayed in the map display area 502 as shown in FIG. 4, and camera icons 531 and 532 arranged on the map 530 are also displayed.

FIG. 5 shows an image display window 600 which displays inputted image signals. FIG. 5 shows an example where an image signal received via the network 100 is displayed in each of the windows.

Referring to FIG. 5, the areas 610, 612, 614, 616, 618 and 620 in the image display window 600 denote the image display areas. Although the present embodiment has six image display areas, the present invention is not limited to this. The map window 500 shown in FIG. 3 and the image display window 600 shown in FIG. 5 may be displayed on the same screen, or may be displayed in a separate monitor apparatus. The image display window 600 also has a trash icon 632 for deleting (log off) a displayed camera image from the image display area. In addition, a camera control panel 640 is arranged by the image display window 600. The camera control panel 640 comprises various buttons for controlling a camera, so that panning/tilting zooming of a selected camera can be controlled. Note that the panel 640 may be displayed on the same screen as the windows 500 and 600, or may be displayed on a different screen.

Referring to the camera control panel 640 shown in FIG. 5, reference numerals 641 and 642 denote buttons for controlling a tilt angle; 643 and 644, buttons for controlling a pan angle; and 645, a button for setting the camera angle at a home position (pan angle: pan head setting direction, tilt angle: a predetermined value). Reference numeral 646 denotes a button for instructing enlargement, and 647, a button for instructing reduction. These buttons are selected by operating the mouse 28 to move the cursor on a desired button and clicking with the mouse.

The Graphical User Interface (GUI) used in the monitoring system of the present embodiment will be described next with reference to FIGS. 6–10.

Figure 7:
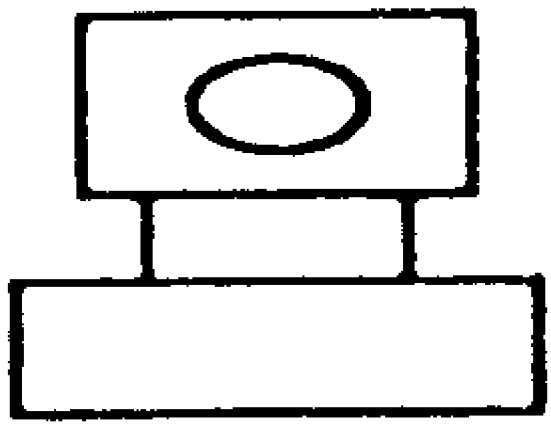
FIG. 7 shows a shape of a mouse cursor when D&D operation is performed.

When a camera icon is dragged from any of the map 510, 520, 530 or 540 and dropped in an arbitrary image display area (the area 614 in FIG. 6) in the image display window 600, a moving image sensed by the camera corresponding to the selected (dragged and dropped) icon is displayed on the image display area where the icon is dropped. (Herein, the drag and drop operation is equivalent to the operation of moving the cursor 28a to a predetermined subject, moving (drag) the cursor 28a while the mouse 28 is depressed, and releasing (drop) the depression at a predetermined position. This operation will be referred to as D&D operation hereinafter.) FIG. 6 shows the condition where the camera icon 523 is dragged and dropped in the image display area 614. During the dragging operation, the mouse cursor 28a is displayed in the shape of a camera as shown in FIG. 7, enabling an operator to easily confirm that the cursor is currently subjected to D&D operation. At this stage, the map management software 413 searches an ID number of the corresponding camera 10 on the basis of position information of the dragged camera icon 523, and informs the image receive software 412 with respect to the ID of the camera 10 which is subject to D&D operation. The image receive software 412 then finds out panning/tilting angles and the name of the camera 10, and a host name of the image transmission terminal 20 to which the camera 10 is connected, on the basis of the ID, and notifies these information to the camera control client 411 and the map management software 413.

On the basis of the information, the camera control client 411 connects the camera control server 421 of the image transmission terminal 20, to which the subject camera 10 is connected, with the network. Thereafter, camera control is performed by both the camera control client 411 and the camera control server 421. Information such as pan/tilt angles of the camera 10 is constantly notified from the camera control client 411 to the image receive software 412.

Figure 9:
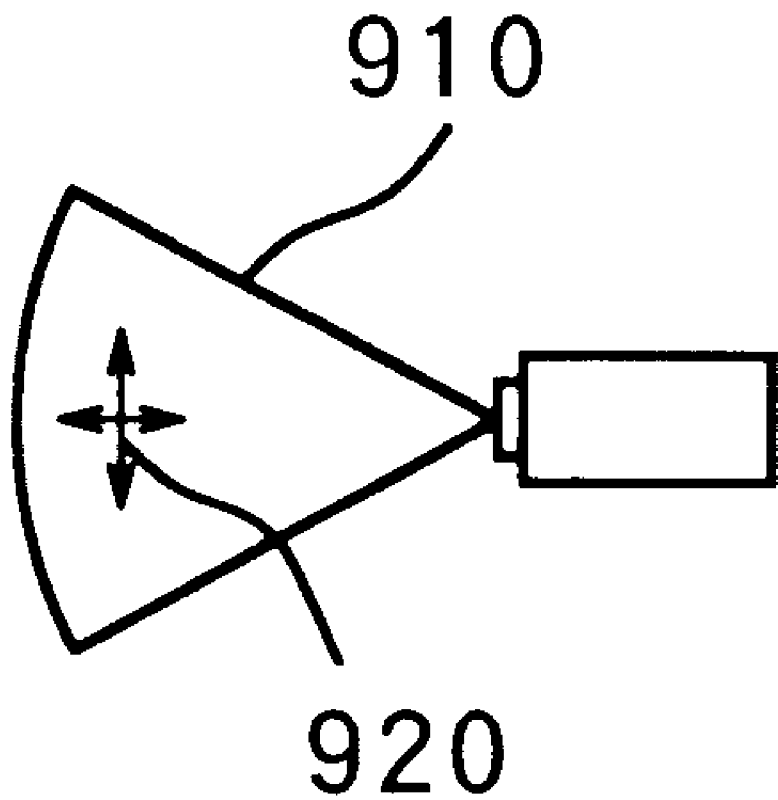
FIG. 9 shows a display example of a camera icon representing a camera currently sensing an image.

The map management software 413 performs to transmit data from a VRAM (video RAM) (not shown) in the video board 136, in order to change the direction of a camera icon in correspondence with the actual direction of the camera 10, or to draw a view scope 910 indicative of display operation of the camera as shown in FIG. 9, or to draw a control pointer 920 in the view scope 910 to be used for controlling panning/tilting and zooming of the camera 10. Note that in order to perform the above-described display, map data stored in the main memory 24 is updated.

The map management software 413 is constantly informed of the information such as pan/tilt of the camera 10 by the image receive software 412. When the pan/tilt or zoom of the camera 10 is changed by the camera control panel 640, the change is immediately reflected on the camera icons 521, 522, 523, 524, 531 and 532. More specifically, when one camera icon is selected, and the button on the camera control panel 640 or the pointer 920 displayed in the selected camera icon is operated by the mouse 28, the instruction information is transferred to the image transmission terminal 20. Then, in accordance with a packet of condition information which is sent by the image transmission terminal 20 regarding the camera 10, the directions or the like of the corresponding camera icon are corrected and displayed.

Note that in a case where a plurality of image transmission terminals and a plurality of monitoring terminals exist on the network, an operator of each monitoring terminal can freely operate a desired camera, as long as the camera is not being operated by someone else. In this case, each of the image transmission terminal may transmit camera condition information to the monitoring terminal which most currently performed camera control, or may transmit the information to each of the monitoring terminals. In the latter case, the display conditions of the plurality of camera icons (camera icons corresponding to the cameras operated by someone on the network) displayed on the map are changed accordingly.

In response to a request sent by the image receive software 412, transmission of image data is executed. The image receive software 412 requests the image transmit software 422 of the image transmission terminal 20, to which the corresponding camera 10 is connected, to transmit the data corresponding to one frame via the network 100. In response to the request, the image transmission software 422 divides the frame of the newest-captured data into packets and transmits it to the image receive software 412. The image receive software 412 reconstructs a frame from the packets and displays the image in a corresponding display area, then again performs image transmit request. This process is rapidly repeated, whereby displaying a moving picture of the video camera 10 on the bit map display 135. To display images sensed by a plurality of cameras 10, the aforementioned processing is sequentially repeated: sending an image transmission request to the image transmit software 422 stored in the image transmission terminal 20 to which each of the cameras 10 is connected, compressing the captured image, dividing the image into packets, data transmission via network, receiving the packets, reconstructing the frame, decoding, decompressing and displaying.

Figure 8:
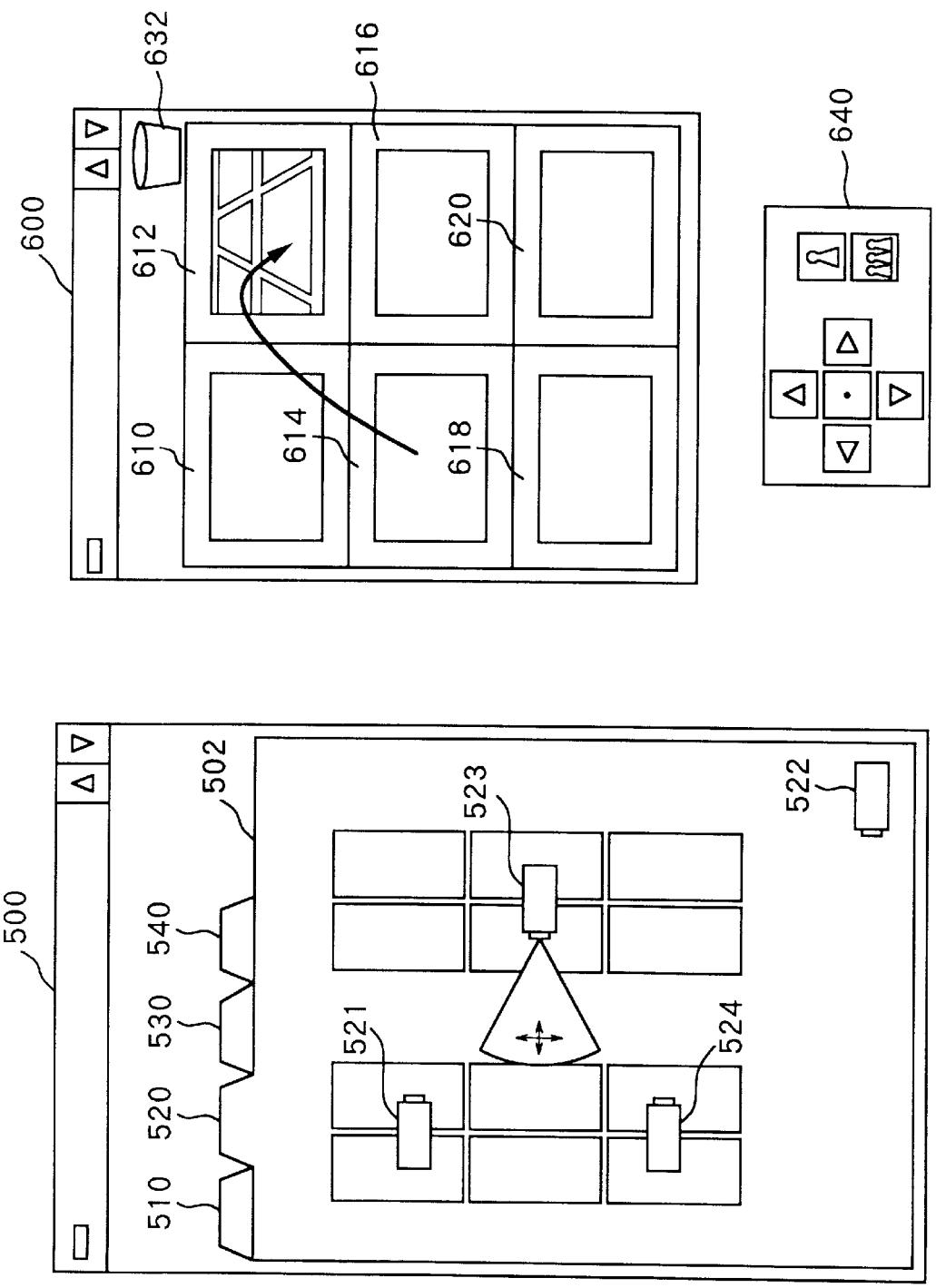
FIG. 8 shows a condition where an image display area is changed by D&D operation.

The displayed image in the window can be moved by D&D operation of the image display area as shown in FIG. 8. FIG. 8 shows the condition where an image sensed by the video camera 523 displayed in the image display area 614 is moved to the image display area 612.

Figure 10:
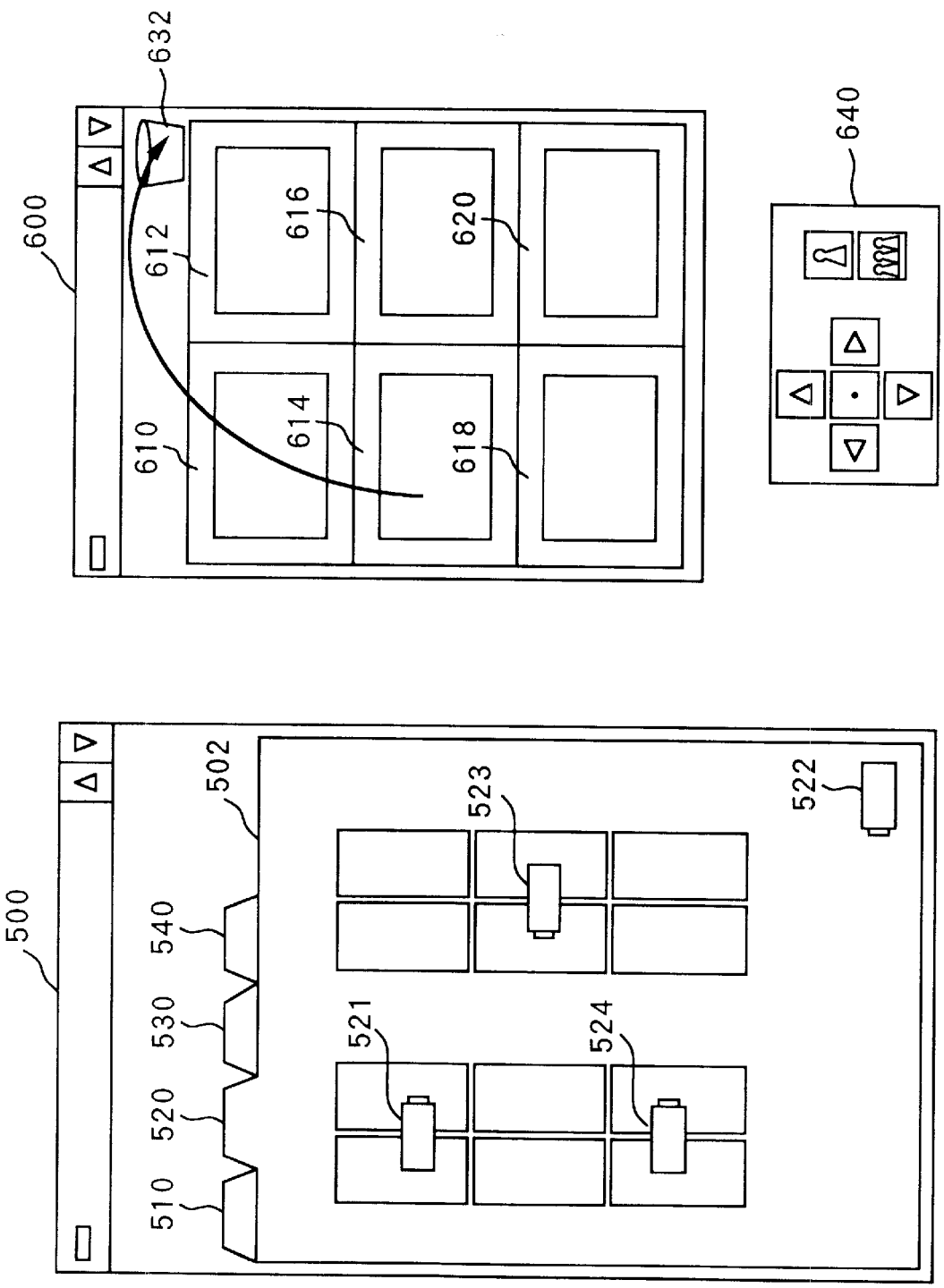
FIG. 10 shows a condition where image displaying is quit by D&D operation.

At this stage, the image receive software 412 clears the image displayed in the image display area 614 and changes internal parameters such that the image of the corresponding video camera 10 is displayed in the area 612, which is the destination of the D&D operation. Thereafter, the image is displayed in the image display area 612. Note that the logical network connection is not disconnected by this operation. In other words, once connection is established with the network, it will not be disconnected unless the image display, area is dragged and dropped into the trash icon 632. In a case of quitting the displaying of an image sensed by the video camera, as shown in FIG. 10, the image display area is dragged and dropped into the trash icon 632 in the image display window 600. FIG. 10 shows the condition after quitting displaying of an image sensed by the camera 10 corresponding to the camera icon 523, which was displayed in the image display area 614. The image receive software 412 clears the image displayed in the image display area 614 and stops sending the image transmit request to the corresponding image transmit software 422. Further, the image receive software 412 notifies the camera control client 411 and the map management software 413 that the displaying is stopped. Upon receiving the information regarding stopping of displaying, the camera control client 411 disconnects the network connection of the camera control server 421. Moreover, the map management software 413 removes the scope display from the camera icon 523 corresponding to the camera 10 and updates the map data stored in the main memory 24.

The system which performs the above described operation utilizes a text file called "map file" to set names of the map, tag names, a bit map displayed on the background, a camera icon which is superimposed on the map, directions of the pan head and the like.

In the map file, "map data" and "camera data" having more than one data is stored, and information with respect to a background bit map to be displayed with a camera icon is described.

The setting of the present system can be easily changed by referring to an arbitrary map file.

For the purpose of explanatory convenience, the terms used in the present specification are defined as follows.

Herein, "map data" includes:
(1) a name of a single map (referred to as a "map name");
(2) a name of a tag of a map (referred to as a "map tag name"); and
(3) a name of an actual file of a background bit map displayed on the map window 502 (referred to as a "bit map name").

"Camera data" includes:
(1) a name of an image transmission terminal to which each of the cameras is connected (referred to as a "host name");
(2) a position where a camera icon defined by absolute coordinates on the background bit map is combined with a background (referred to as a "camera position");
(3) an initial direction of a pan head of a camera (when a camera faces the center of the possible range of panning, the camera direction will be herein referred to as a camera's "initial direction");
(4) a name of a camera (referred to as a "camera name"); and
(5) a parameter indicative of whether or not the camera is remotely controllable (referred to as a "camera type").

The combination of corresponding map data and camera data, and a combined screen of a camera icon and a background bit map, generated based on these data, will be referred to as the "map."

Since all the above elements are described in the map file as text data, they can be edited by a general text editor. However in this case, the series of processing: edit, display and confirm, must be repeatedly performed. To improve this process, the present embodiment suggests to utilize the "map editor" which enables easy edit operation in a short period of time in the manner of WYSIWYG (What You See Is What You Get).

Before providing description on the map editor, the contents of the map file are first described.

FIG. 31 shows an example of contents of the map file (text file) generated by the map editor according to the present embodiment.

As mentioned above, the map file includes the map data and camera data.

The symbol "+" shown in FIG. 31 is a delimiter for starting map description. Three types of data: a map name, a file name of image data to be used as the background of the map, and a map tag name, are described in a single line, being separated from one another by a space or a tab. Note that the data to be used as the background of the map is not limited to image data, but may be drawing data.

The symbol "$" is a delimiter for starting camera data description. The data described thereafter in a single line are: map name, address (name) of an image transmission terminal on the network, camera position defined by (X, Y) coordinates, initial direction of the pan head, form of connection (value between 0 to 2), channel number (value between 0 to 4), camera name and camera type (in the present embodiment, either VCC or OTHER).

For instance, in FIG. 31, the three lines starting from the map name "FLOOR1" indicate that the camera symbols called "CAMERA1", "CAMERA2" and "CAMERA3" are displayed on the map corresponding to "FLOOR1."

The form of connection, channel number, and camera types will be briefly described next.

The form of connection indicates the connection form of a plurality of cameras connected to the image transmission terminal. If connected as shown in FIG. 1, "0" is set; if connected with a switcher, "1"; and if connected with a switcher and a combine device, "2".

In a case where only a single camera is connected to the image transmission terminal, a switcher is unnecessary, thus "0" is set as the channel number. In a case where a plurality of cameras (camera controller 12) are connected, the switcher is necessary, thus the respective channel number 1, 2, 3 or 4 is described.

The camera type to be set in the present embodiment is either VCC or OTHER. VCC denotes a camera capable of remote operation, and OTHER denotes a camera incapable of remote operation.

Hereinafter, description will be provided on the map editor.

Figure 11:
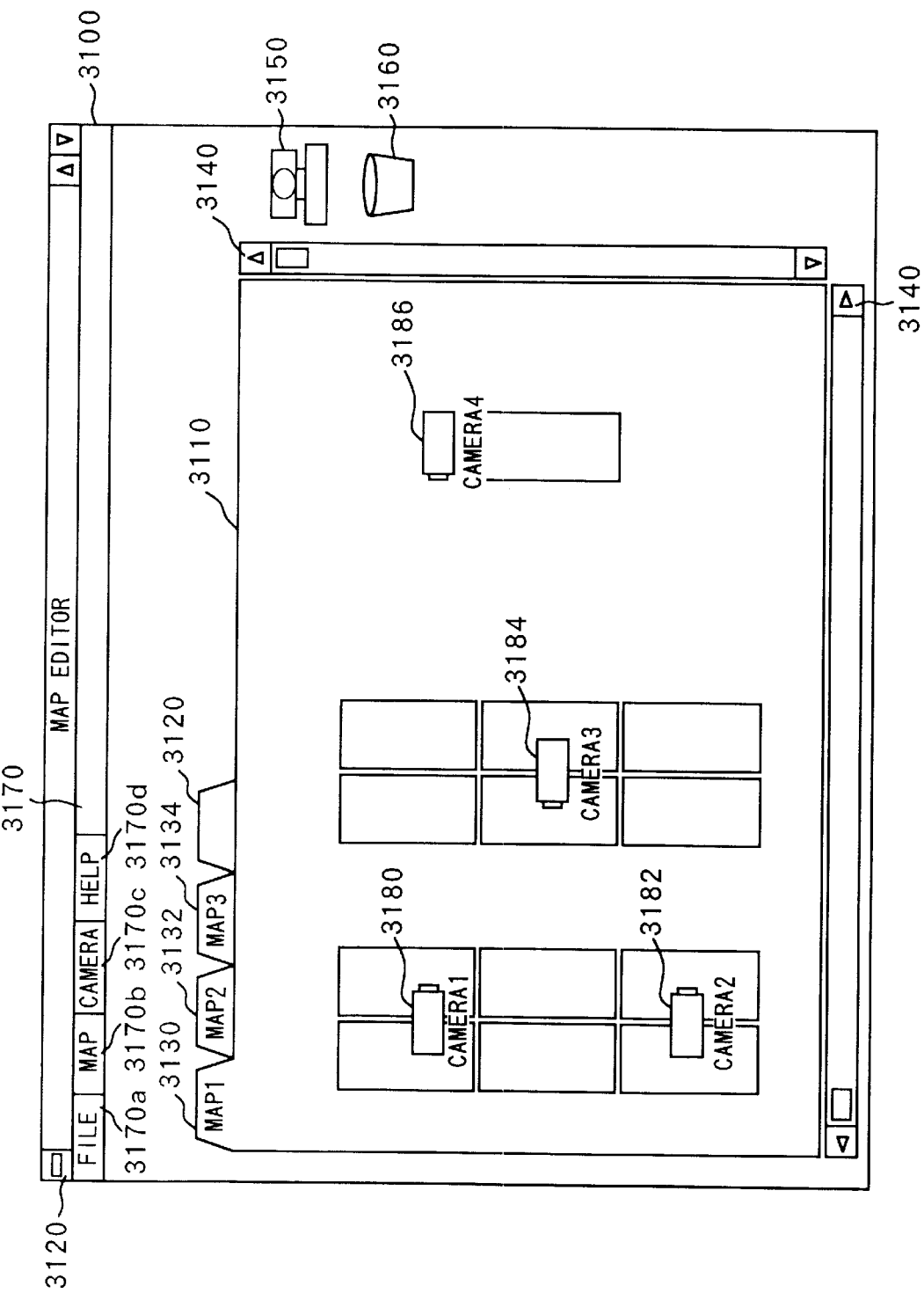
FIG. 11 shows an example of a display screen of a map editor according to the present embodiment.
Figure 12:
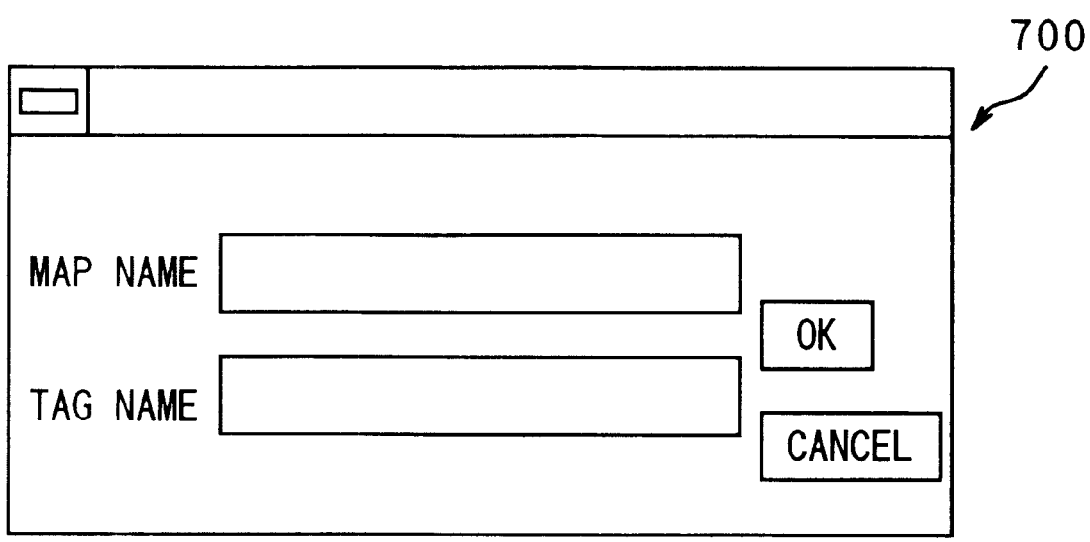
FIG. 12 shows a map name dialogue box according to the present embodiment.
Figure 13:
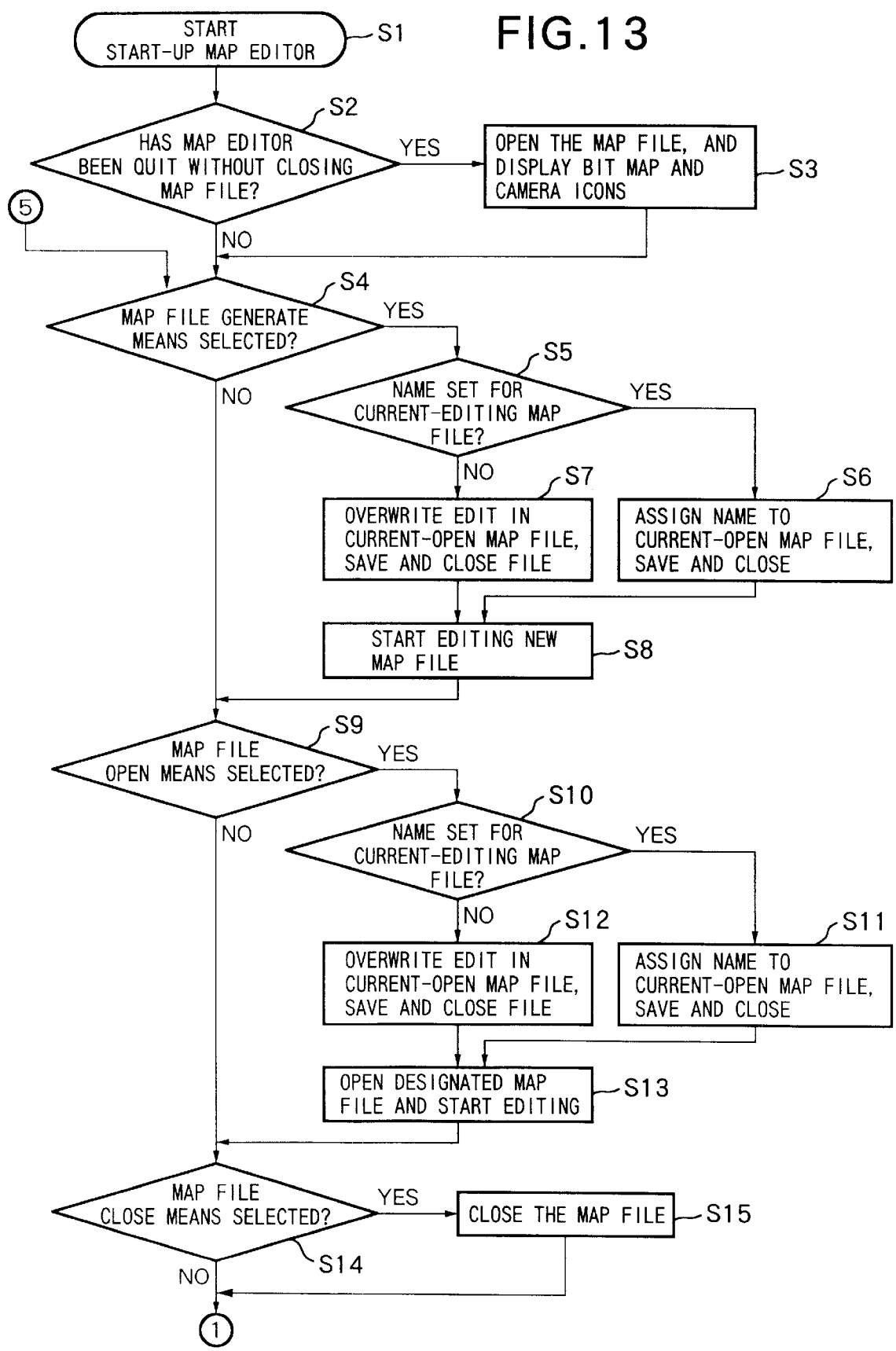
FIGS. 13–17 are flowcharts showing the steps of processing by the map editor according to the present embodiment.
Figure 14:
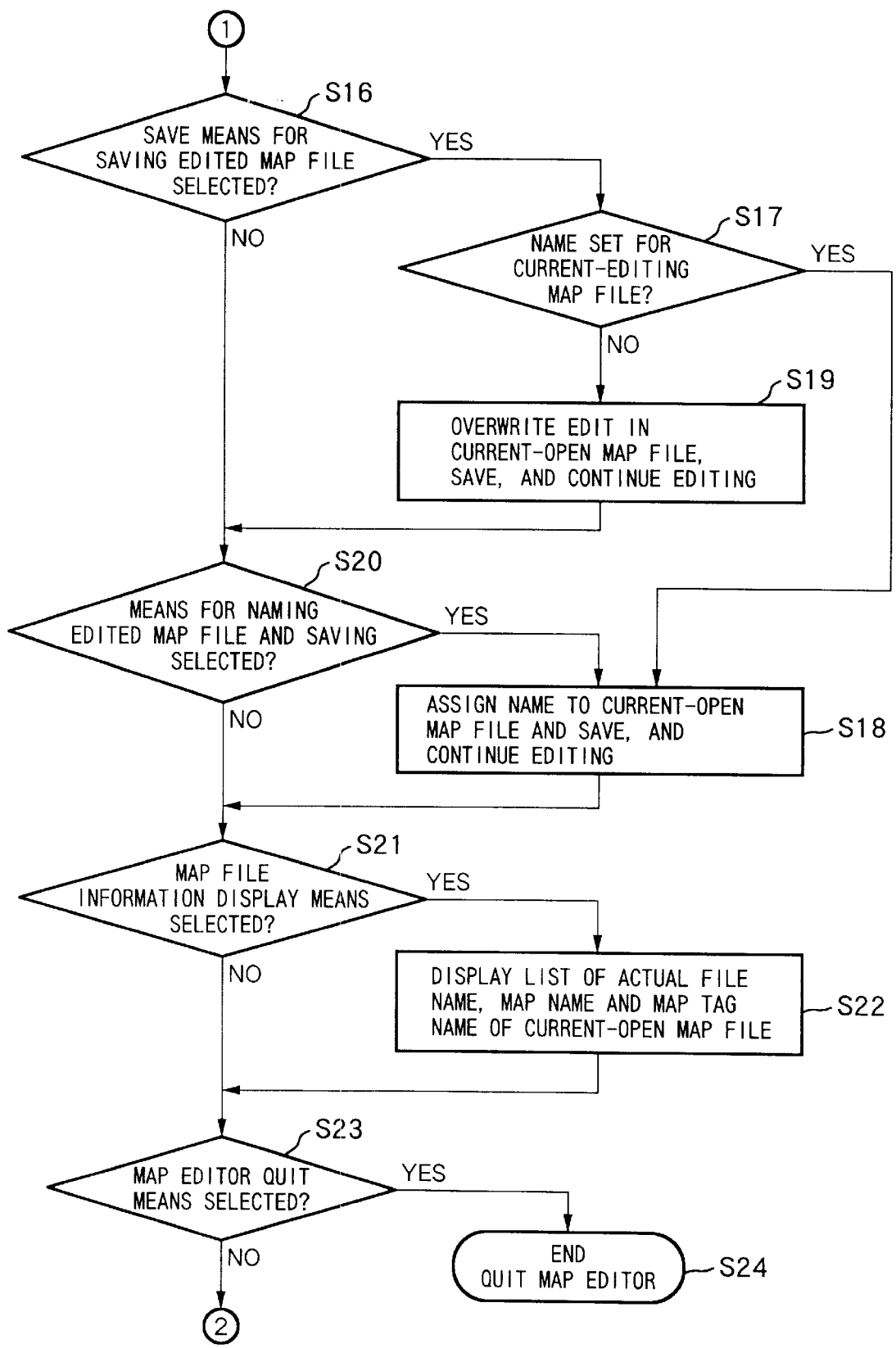
Figure 15:
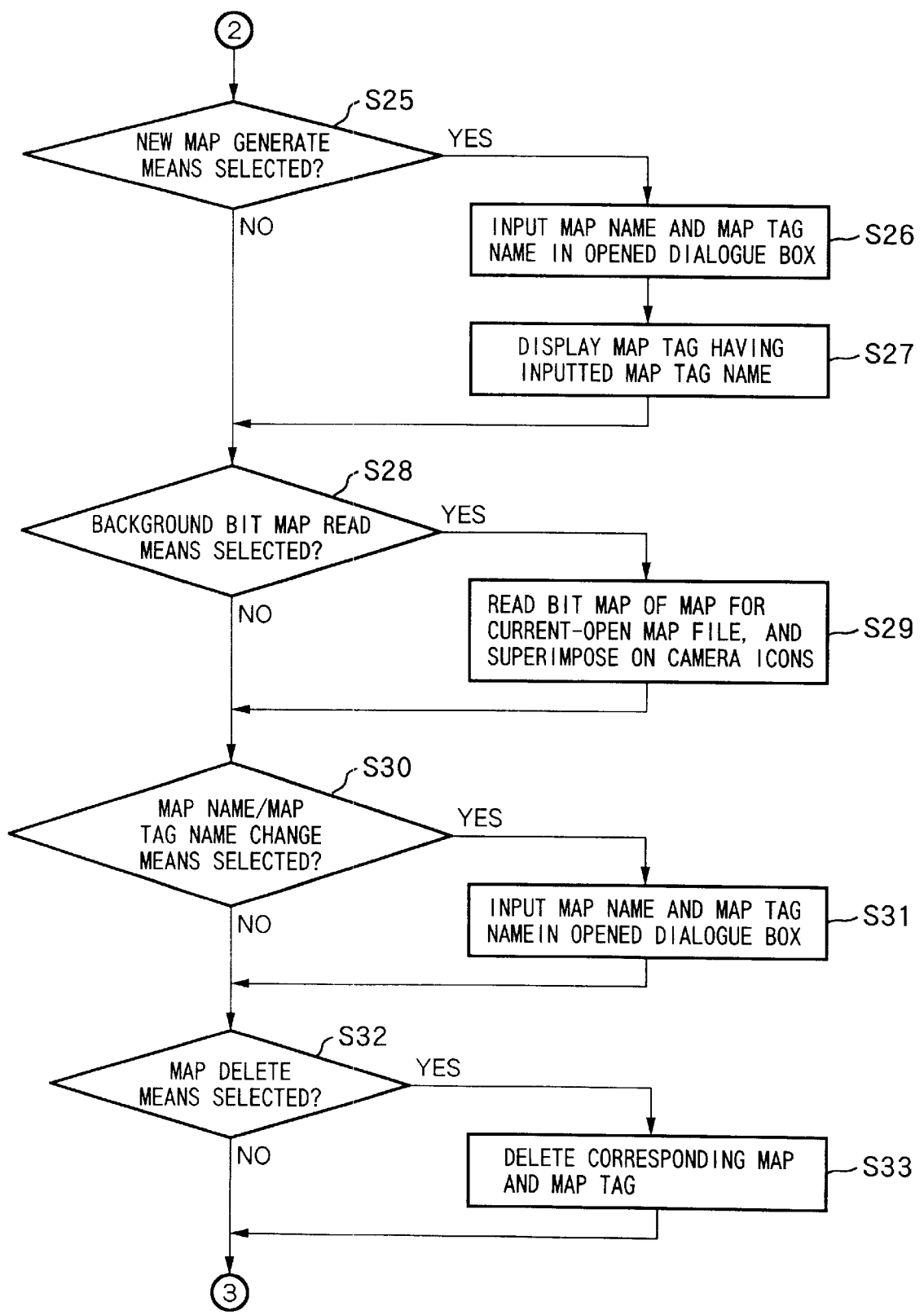
Figure 16:
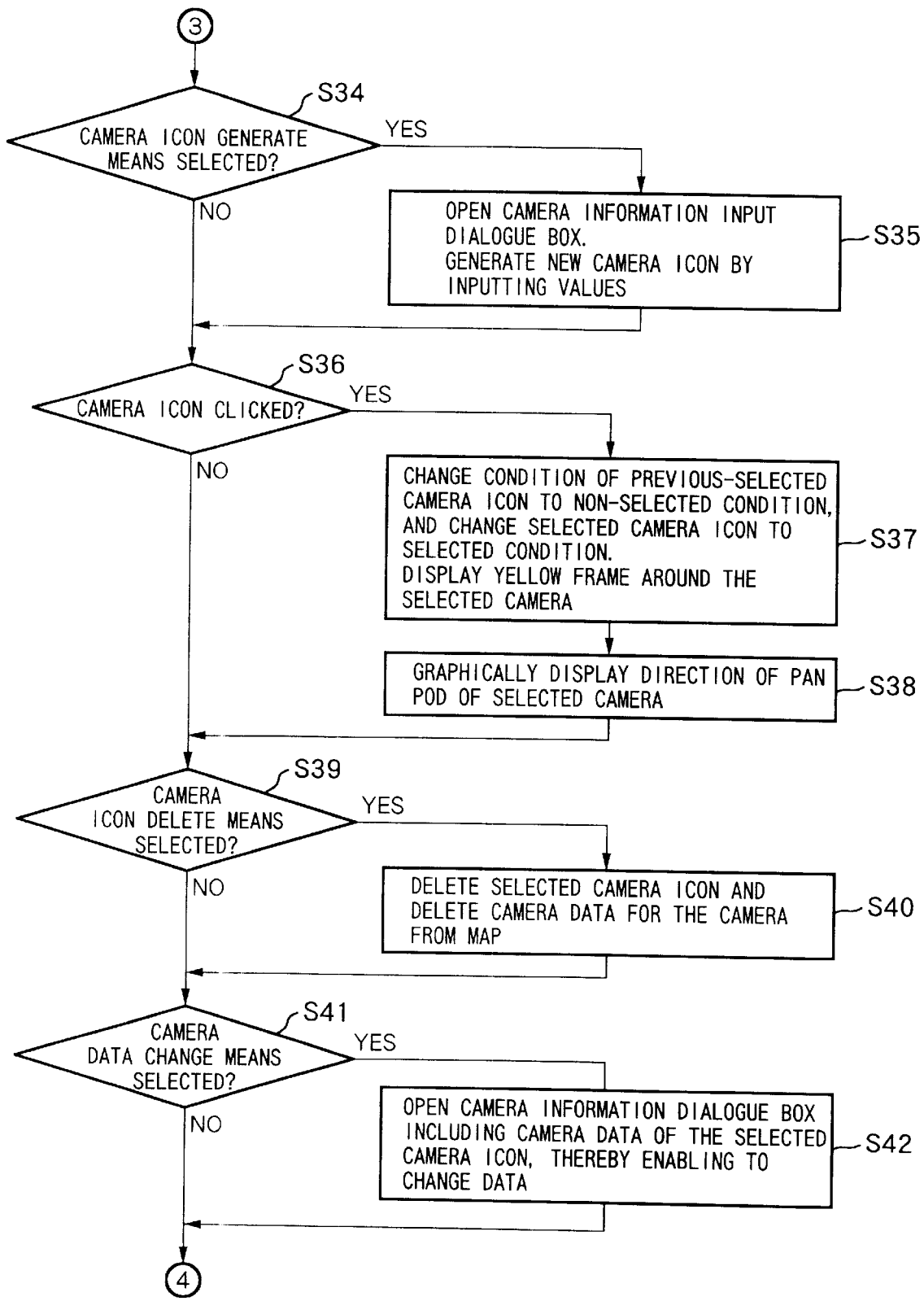
Figure 17:
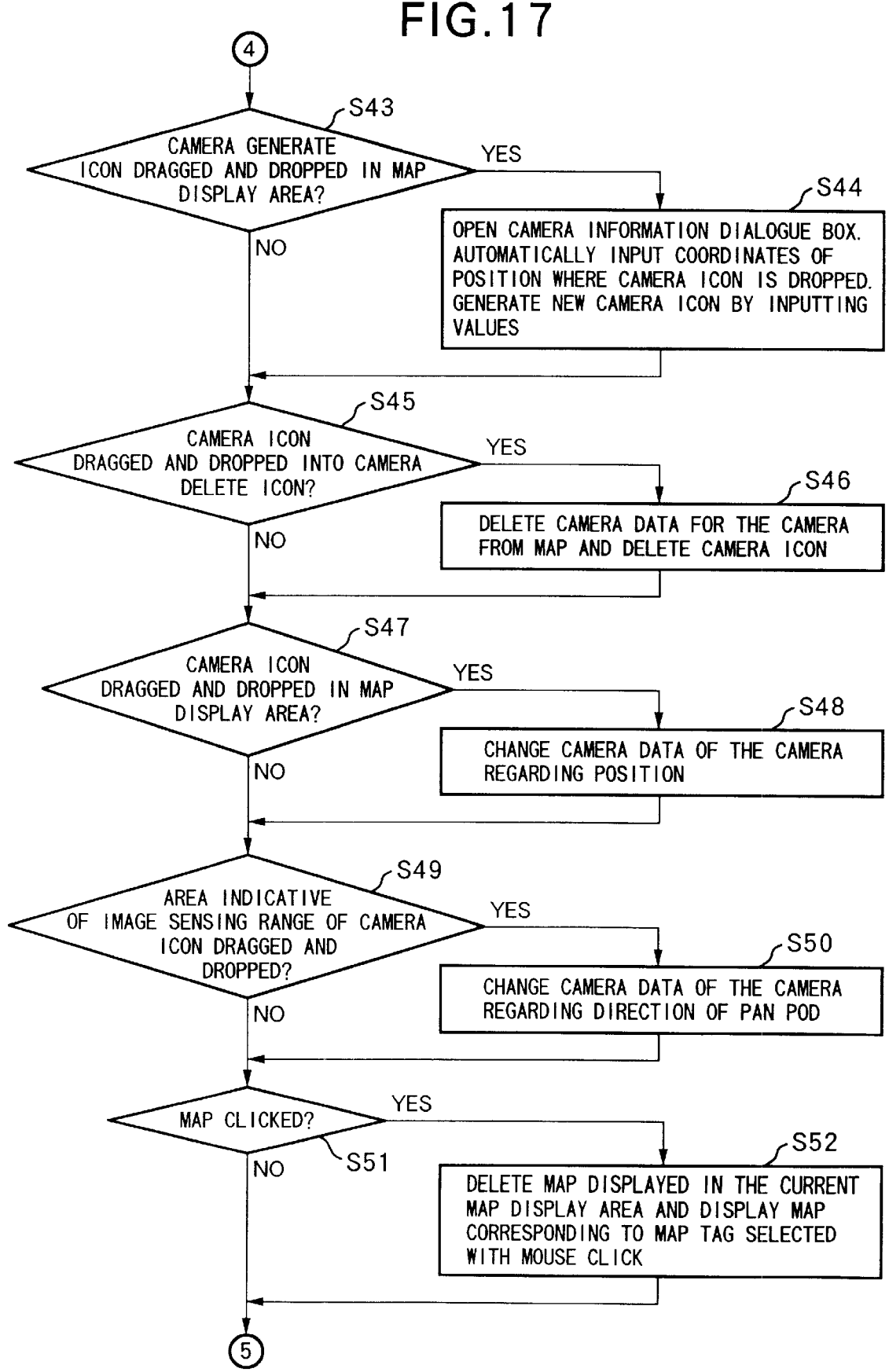

FIG. 11 shows the GUI of the map editor. Reference numeral 3100 denotes a map editor window; and 3110, a map display window where a background bit map is displayed for a map corresponding to any of map tags 3130, 3132 and 3134 selected immediately before displaying. FIG. 11 shows the condition after the tag 3130 having the map tag name "MAP1" is selected by mouse click. The map having the map tag named "MAP1" includes camera data indicated by camera icons 3180, 3182, 3184 and 3186. Below each of the camera icons 3180, 3182, 3184 and 3186, camera names "CAMERA1", "CAMERA2", "CAMERA3" and "CAMERA4" respectively, are displayed. The map tag names "MAP1", "MAP2" and "MAP3" are displayed on the map tags 3130, 3132 and 3134. The tag 3120 is a map generate tag. When the tag 3120 is clicked, a map name dialogue box 700 as shown in FIG. 12 is displayed and a new map can be generated. Reference numeral 3140 denotes a slider bar, which is displayed if the map display window 3110 is smaller than the displayed bit map, and enables to scroll the bit map and the camera icons. Reference numeral 3150 denotes a camera generate icon. If the icon 3150 is dragged and dropped on a background bit map displayed in the map display area, a camera icon is newly generated on the dropped position. Reference numeral 3160 denotes a camera delete icon. If a camera icon, superimposed on the background bit map in the map display window 3110, is dragged and dropped into the icon 3160, the selected camera icon is deleted. Reference numeral 3170 denotes a pull-down menu display area. All the functions of the map editor can be selected from the menu. The present embodiment provides "file" 3170a, "map" 3170b, "camera" 3170c, and "help" 3170d as the pull-down menu. Descriptions thereof will be provided later in detail.

Description will be provided next on the steps of generating a map file by utilizing the above described map editor, with reference to the flowcharts shown in FIGS. 13–17.

Figure 18:
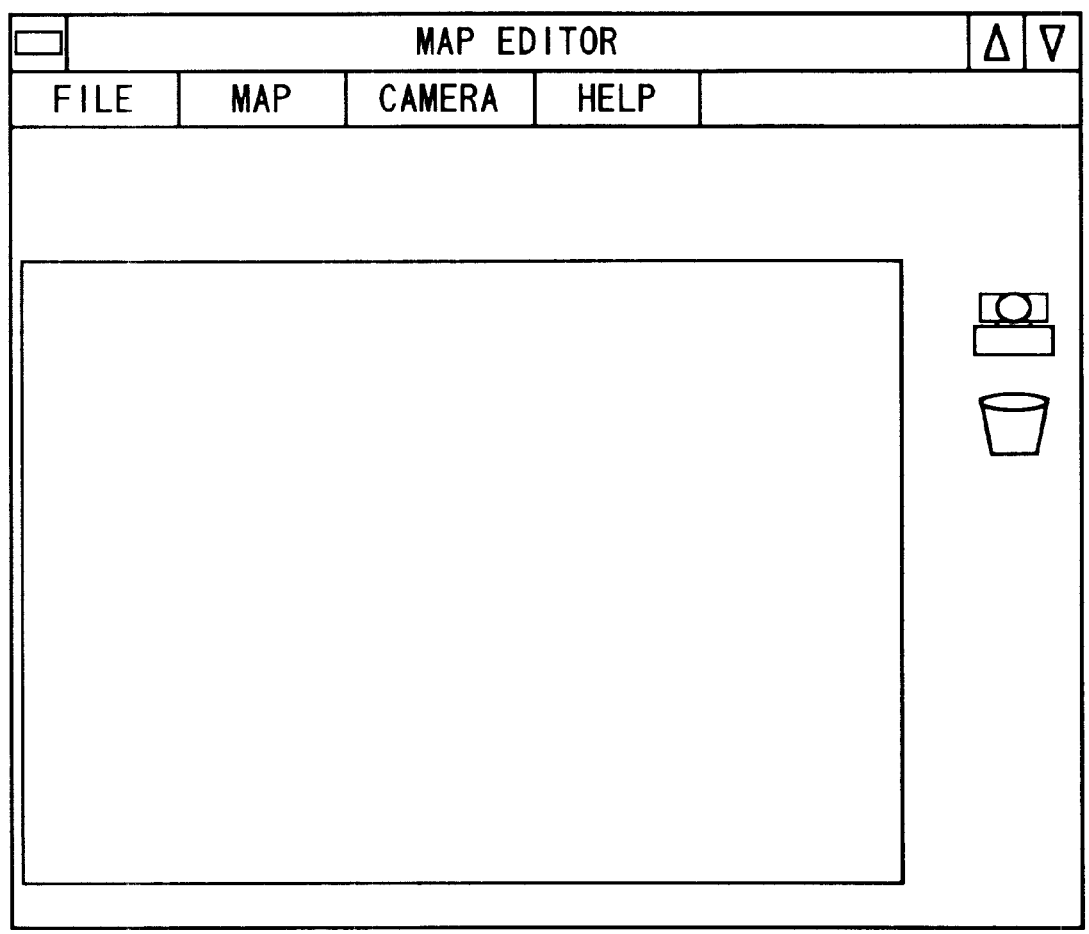
FIG. 18 shows a condition where a map file is closed by the map editor.

When the map editor (application) is started (S1), the map editor first determines whether or not the editor was quit without previously closing a map file (S2). If it is determined that the map editor was quit without closing a map file, at the time of start-up of the map editor, the map file is automatically opened, displaying the bit map and camera icons (S3). Note that if the map editor is quit after a map file is closed, the map file will not be opened at the next start-up of the map editor. In this case, the condition such as that shown in FIG. 18 is displayed, where the map generate tag 3120, and map tags 3130, 3132 and 3134 are not shown.

Next, the map file is edited. An operator can edit a map file by newly generating a map file (S4–S8), or by opening an existing map file and editing thereof (S9–S13).

Figure 19A:
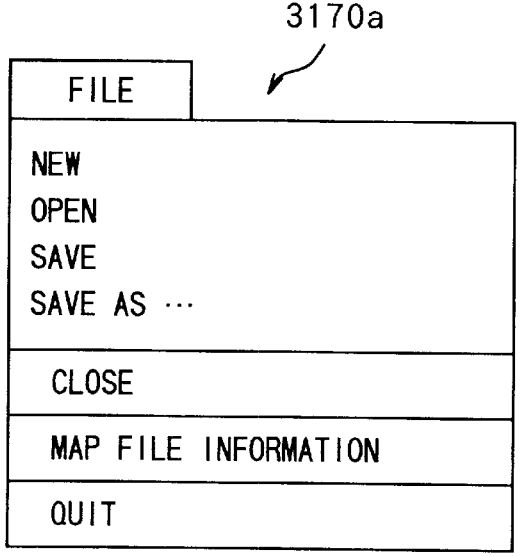
Figure 19B:
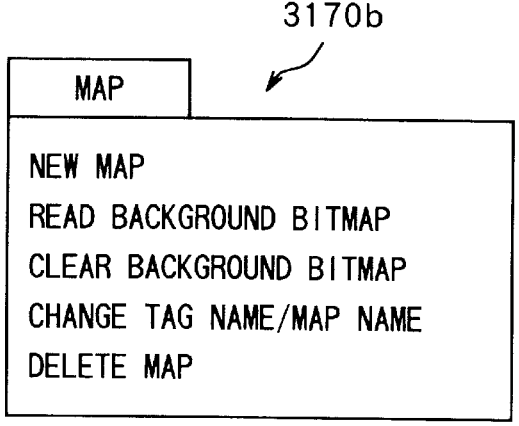

First, it is determined whether or not a map file is to be newly generated. More specifically, it is determined whether or not the menu "NEW" (new map file generate means) is selected (mouse click) from the file menu 3170a which is the pull-down menu shown in FIG. 19 (S4). When the menu "NEW" is selected, it is determined whether or not a name is set for the current-editing map file (S5). If it is not set, a name is assigned to the current-open map file, and the file is saved and closed (S6). If a name has been already set for the current-editing map file, the edit is overwritten in the current-open map file and saved, then the file is closed (S7). Then, a new map file whose name has not been set is edited (S8). Immediately after the menu "NEW" is selected, the map generate tag 3120 is displayed as shown in FIG. 20 to enable new map generation.

In order to generate a new map, map generate means is selected. In this case, in the flowcharts of FIGS. 13–17, steps S9, S14, S16, S20, S21 and S23 are skipped, and it is determined in step S25 whether or not means for generating a new map is selected. More specifically, the map generate tag 3120 (FIG. 20) is clicked with a mouse or selected from a menu. The menu "NEW MAP" is selected from the map menu 3170b which is a pull-down menu shown in FIG. 19B.

Figure 21:
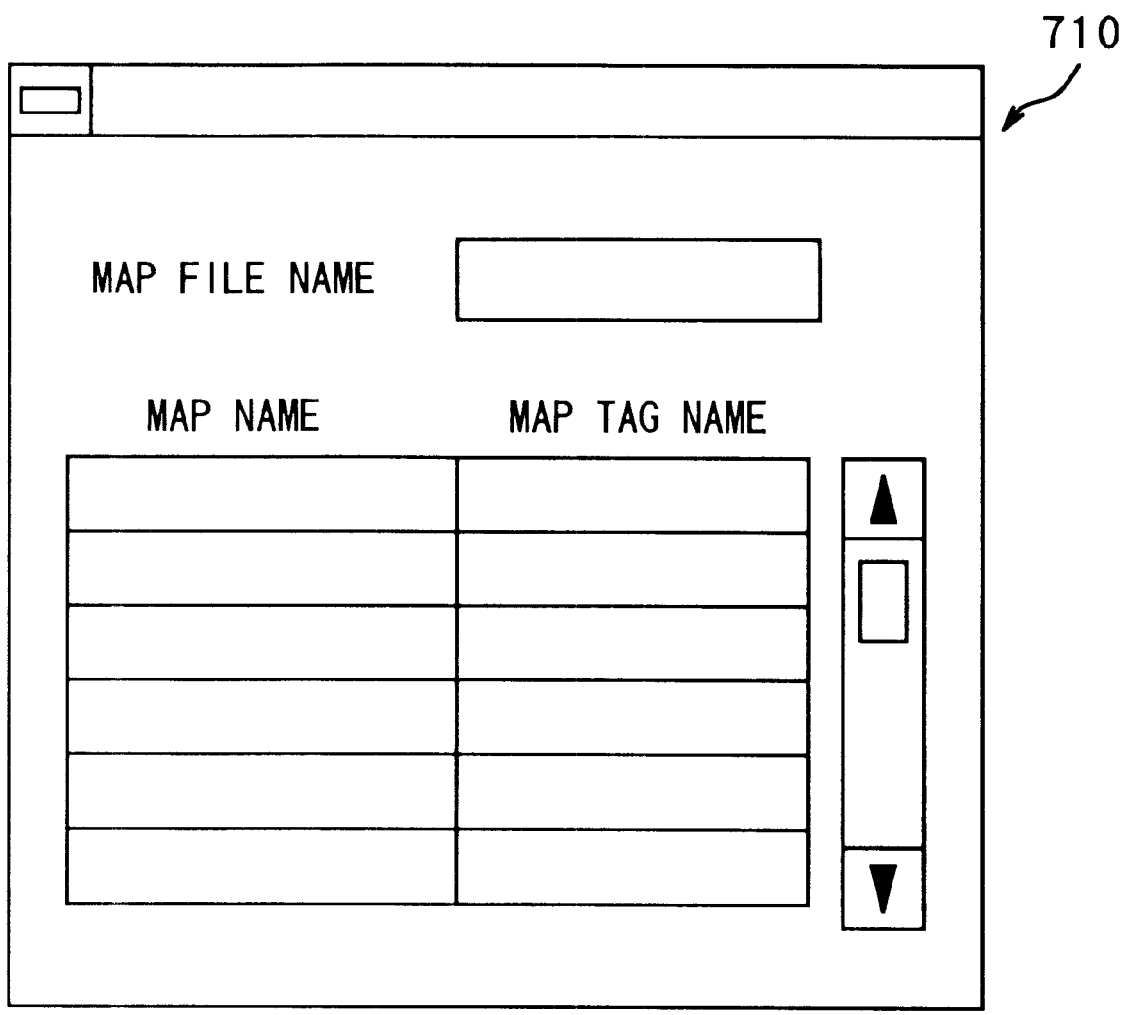
FIG. 21 shows an example of a display screen of an information box storing map files.

When means for generating a new map is selected, the map name dialogue box 700 shown in FIG. 12 is opened, enabling to input a map name and a map tag name to generate a new map (S26). The input map tag name is displayed on the map tag of the map (S27); however, the map name is normally not displayed on the screen. When the map name, map tag name or map file name are to be viewed, map information display means is selected. More specifically, the menu "MAP FILE INFORMATION" is selected from the file menu 3170a shown in FIG. 19A. By this selection, determination is made that the map file information display means is selected (S21), thereafter a map file information box 710 shown in FIG. 21 is displayed, enabling to see a list of an actual file name, map name and map tag name of the current-open map file (S22).

When a background of a map is to be specified, it is determined whether or not designation is made to read a file for a background bit map. More specifically, it is determined whether or not the menu "READ BACKGROUND BITMAP" is selected from the map menu 3170b shown in FIG. 19B (S28). When the menu "READ BACKGROUND BITMAP" is selected, the bit map of a map for the current-open map file is read (S29). The bit map data is stored in the secondary storage 126. When the background is not specified, the background is displayed in white. In the present embodiment, the secondary storage 126 serves as the first memory means.

Figure 22:
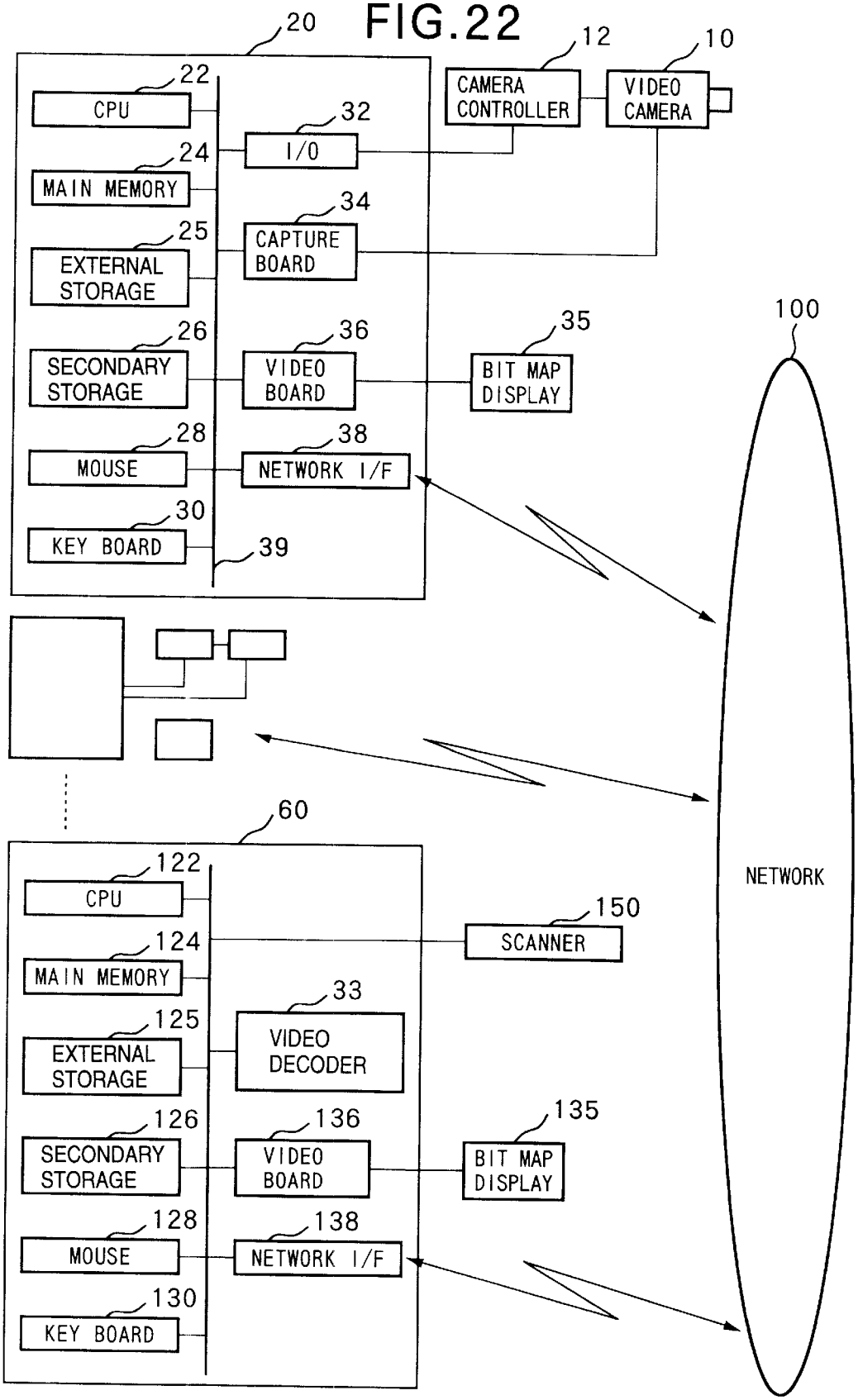
FIG. 22 is a block diagram of a system where a scanner (means for reading a background bit map) is added to the construction shown in FIG. 1.

Description will now be provided for storing bit map data. As shown in FIG. 22, a scanner 150, serving as an image read apparatus (input means for reading a map), is connected to the monitoring terminal 60 which starts the map editor. This enables to directly read the bit map of a map. The read bit map data is stored in the secondary storage 126. By the above process, it is possible to realize bit map reading. Note that although the scanner 150 is connected to the monitoring terminal 60, it may be connected to the image transmission terminal 20 so that data can be received by the terminal 60 via the network 100. Moreover, although the above description states that the bit map data is temporarily stored in the secondary storage 126, the data read by the scanner 150 may be directly handled when the menu "READ BACKGROUND BITMAP" is selected. It should be noted however that it is better to store the data read by the scanner 150 in the secondary storage 126 for the subsequent use.

It is also possible to generate a background bit map by utilizing a drawing tool (map draw means), i.e., application software, instead of reading data from an image read apparatus e.g. the scanner. The drawing tool may be easily started by adding it to the menu 3170. By storing background bit map data generated by the drawing tool in the secondary storage 126, the above described bit map reading is realized. Note that another application stored outside the system may be used as the drawing tool. In such case, it is preferable to include a function which can convert the background bit map data generated by the outside drawing tool into a form applicable to the present system and a function for reading the converted data. The drawing generated by the drawing tool may not be stored in the form of bit map data, but figures such as lines and circles may be stored in the form of drawing parameters (coordinates data or the like).

Generating a camera icon will be described next.

Figure 23:
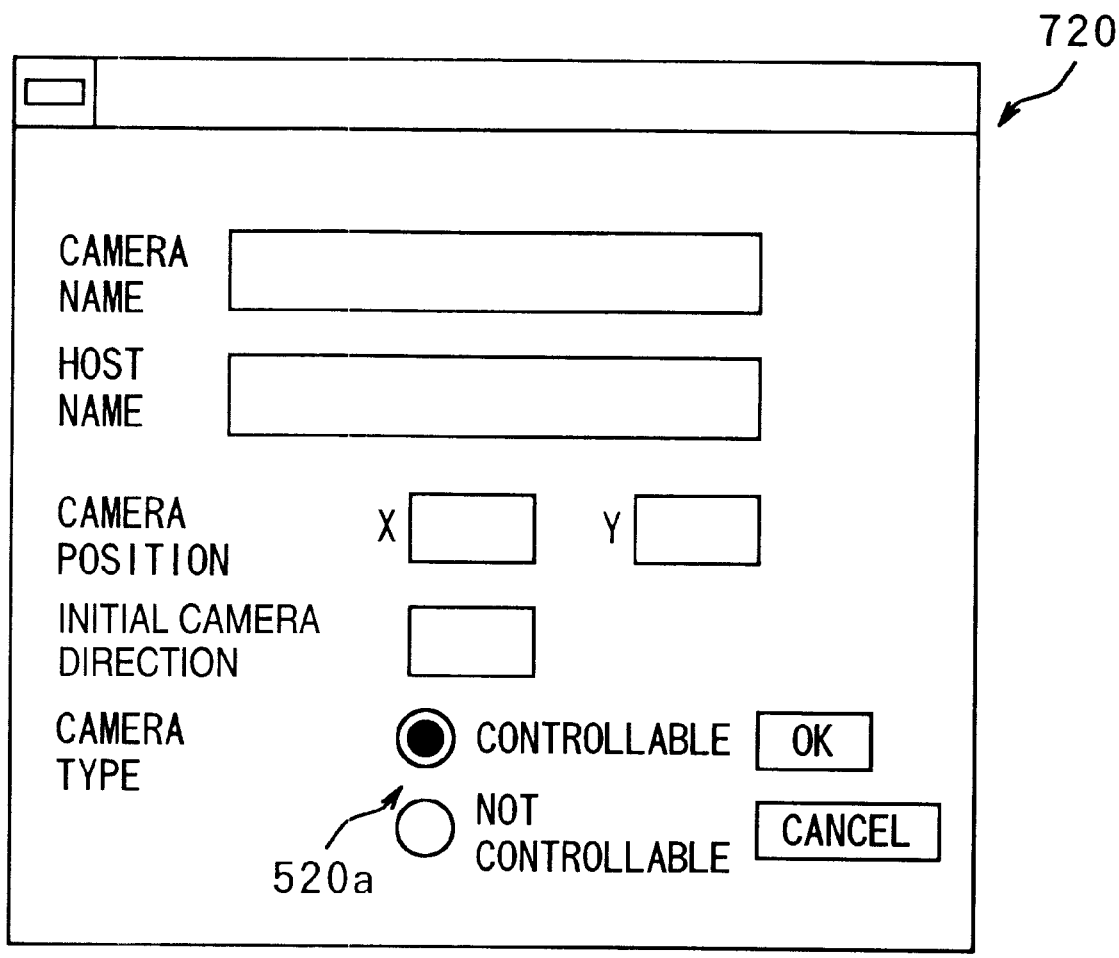
FIG. 23 shows an example of a display screen of a camera information dialogue box.

When a camera icon representing a subject camera is to be generated, camera icon generate means is selected from a menu. More specifically, the menu "NEW CAMERA" is selected from the camera menu 3170c shown in FIG. 19C. When it is determined that the menu "NEW CAMERA" is selected (S34 in FIG. 16), the camera information dialogue box 720 shown in FIG. 23 is automatically opened. Herein, camera data such as position and initial direction of a camera icon is inputted, and a new camera icon is generated and displayed on a corresponding position (S35). Information such as position and initial direction of the camera icon is used at the time of displaying the camera icon on a background. Note that the position (X, Y) of the generated camera icon can be moved by D&D operation. When the position of a camera icon is changed by D&D operation, attribute data (e.g. camera position, camera direction or the like) of the camera may be updated at the moved position.

In the above mentioned camera information dialogue box 720, it is possible to set a camera name, a host name, a camera position, a pan head's (optical axis of the camera) initial direction, and a camera type. The camera position is indicated by (X, Y) coordinates on the background bit map, and the initial direction of pan head is the center of the possible range of panning. The camera type, that is, whether or not the pan head is electrically controllable, is selected by a radio button 520a located at the bottom of the camera information dialogue box 720 in FIG. 23.

Figure 19C:
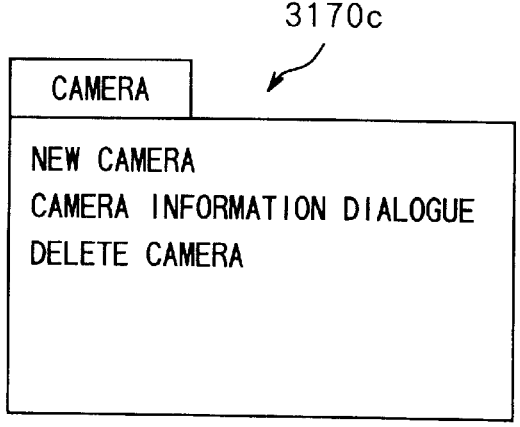
Figure 20:
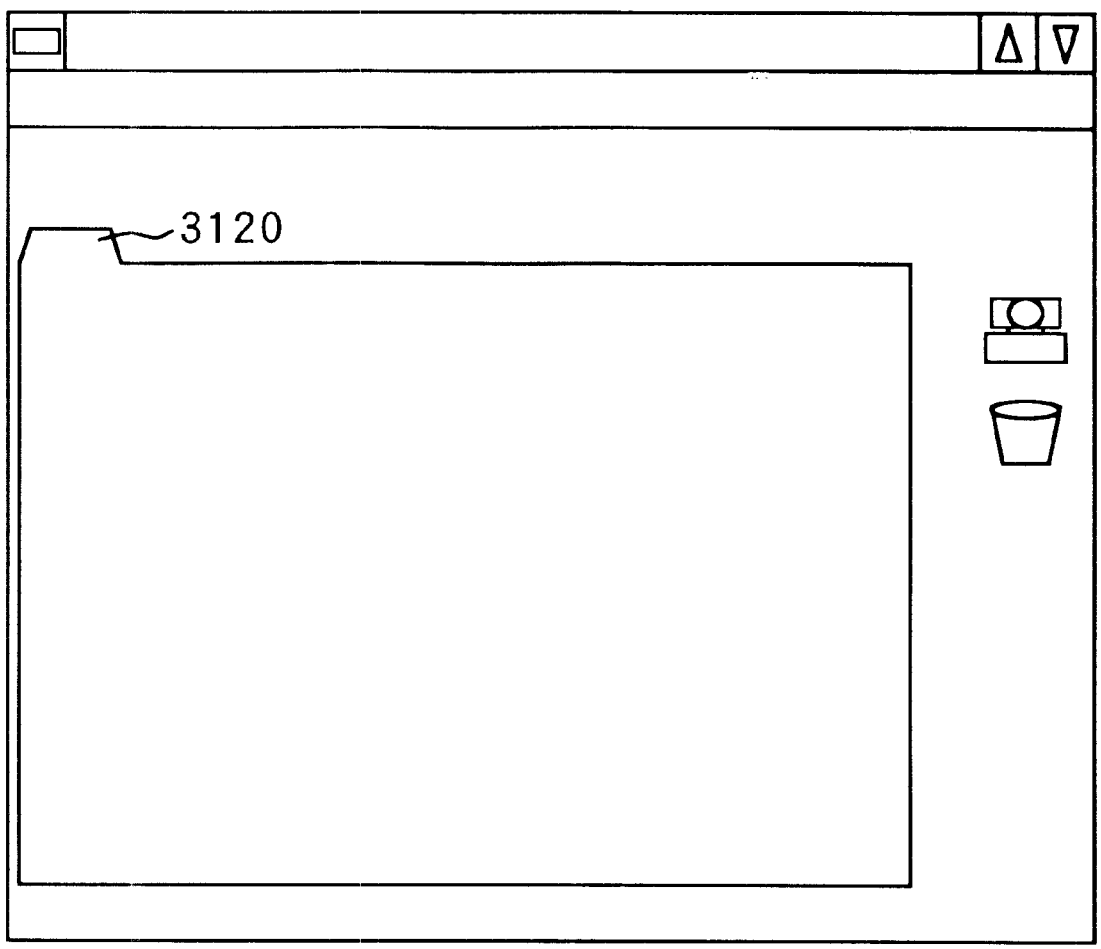
FIG. 20 shows an example of a display screen of a map editor where a map file is newly generated.

If a camera icon (e.g. 3180 in FIG. 11) displayed on the bit map is selected while a new camera icon is not generated, the camera menu 3170c shown in FIG. 19C is displayed. The menu "CAMERA INFORMATION DIALOGUE" (camera data change means) is selected from the camera menu 3170c (S41) to open the camera information dialogue box 720, and camera data for the camera represented by the selected camera icon can be changed (S42).

Figure 24:
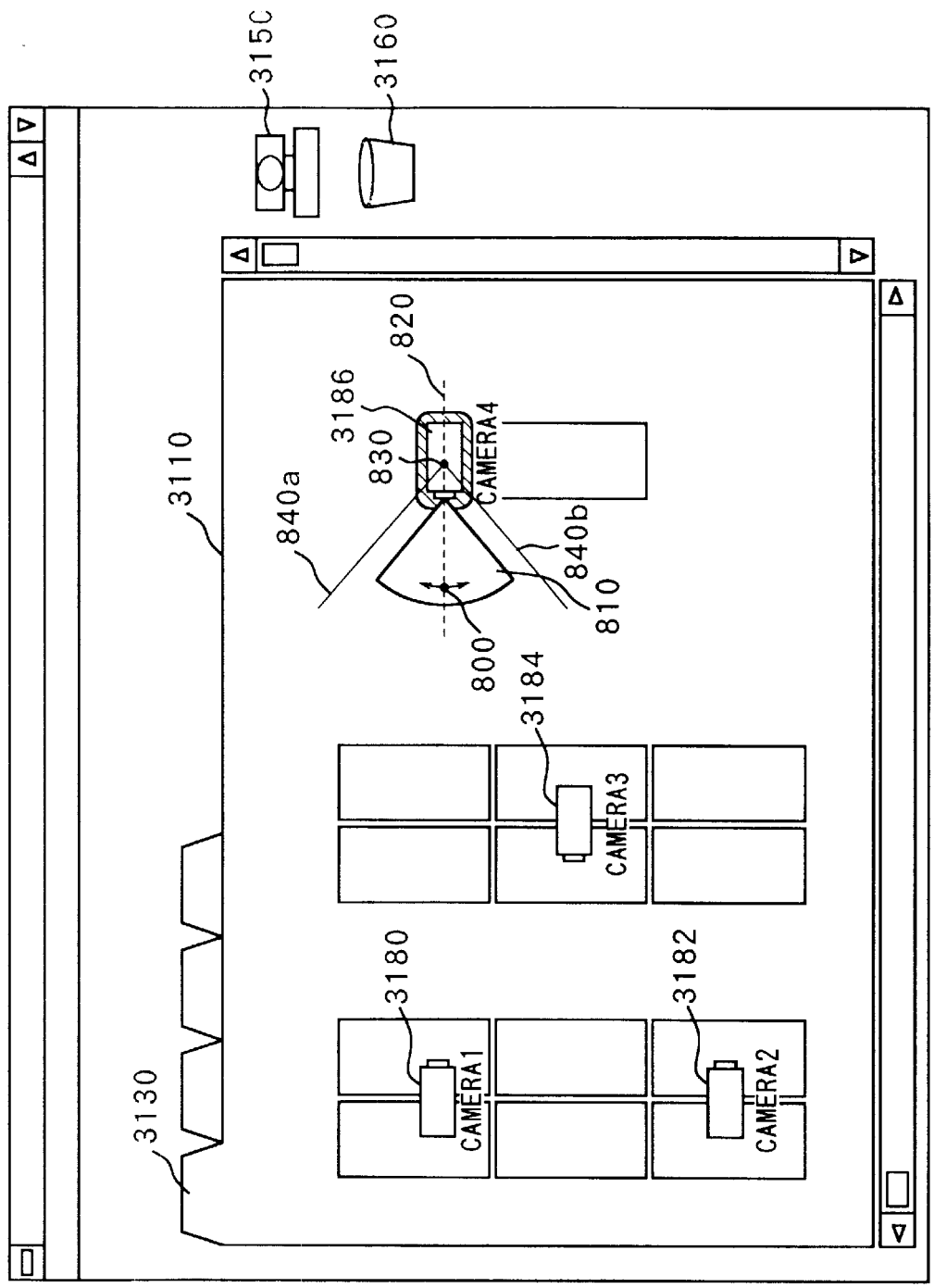
FIG. 24 shows an example of a display screen of a map editor where a camera icon is selected.
Figure 25:
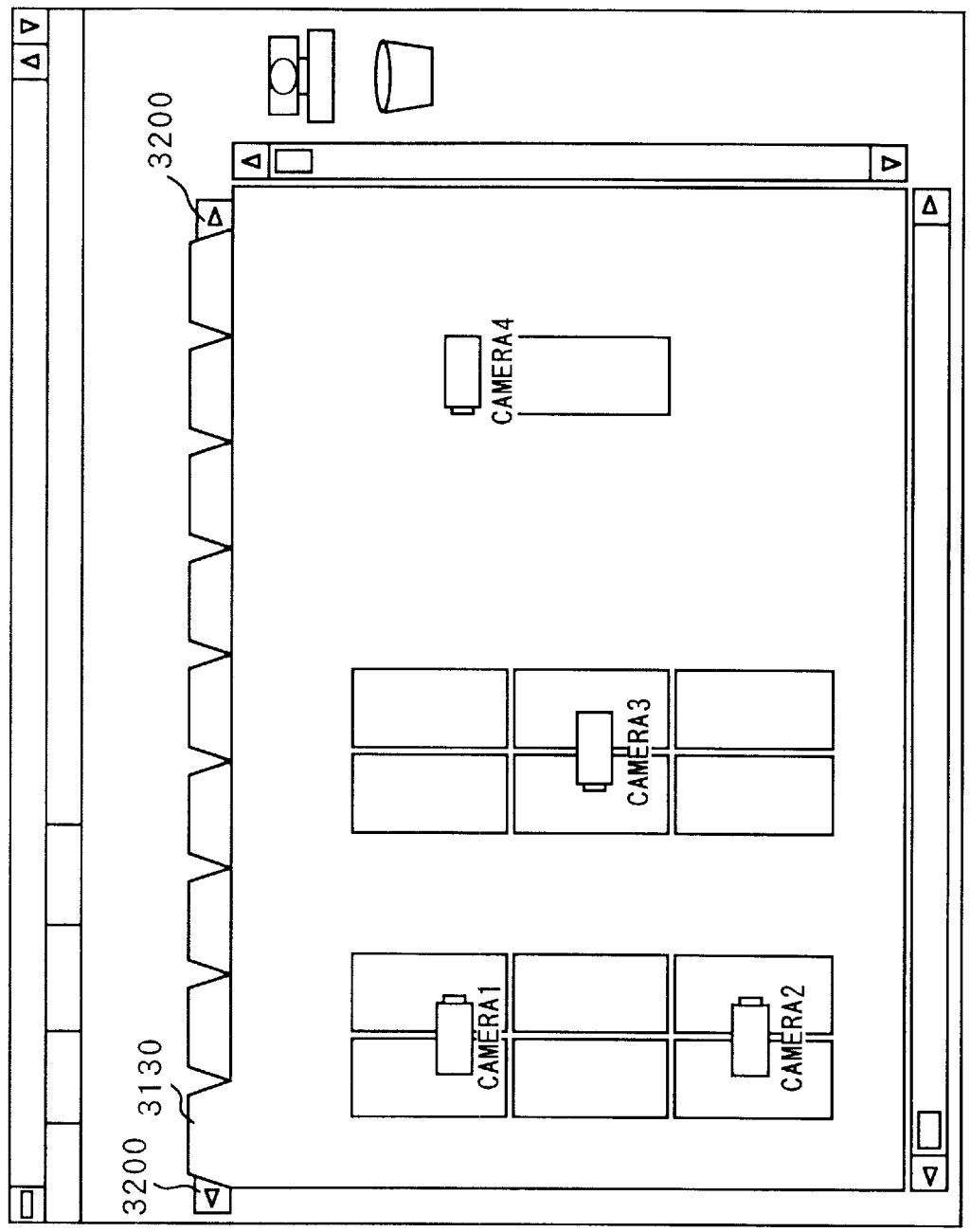
FIG. 25 shows an example of a display screen of a map editor where a map tag scroll bar is displayed.

Selecting a camera icon is realized by clicking a camera icon with a mouse (S36). The selected camera icon 3186 is displayed as shown in FIG. 24, e.g. with an yellow frame (shown in black in FIG. 24), so that it is easy to distinguish the selected camera from other cameras. Since a camera is selected one at a time, the yellow frame of the selected camera icon disappears when another camera icon is selected (S37). Referring to FIG. 24, when a camera icon is selected, a control pointer 800 indicative of the initial direction of a pan head and a view angle range 810 indicative of an image-sensing range are displayed, with an extended line 820 which is drawn in the direction of the pan head as the central axis. The view angle range 810 is not necessarily be shown; instead, the initial direction of the pan head may be indicated by an arrow or the like. Note that a potential pan angle of a pan head is limited (normally, less than 180°). In the case where a camera is set controllable in the camera information dialogue box 720 shown in FIG. 23, the potential pan angle of the camera is indicated by the lines 840*a* and 840*b* as shown in FIG. 24, enabling easy pan control operation with the camera icon. The potential pan angle can be inputted in the camera information dialogue box 720 in FIG. 23. Note that such data is stored in the main memory 24.

Furthermore, when a camera icon (e.g. 3180 in FIG. 11 or FIG. 24) is selected, the camera menu 3170*c* is displayed. By selecting the menu "DELETE CAMERA" from the camera menu 3170*c* (S39), it is possible to delete the selected camera icon from the window and delete the camera data of the camera from the map, so that an unnecessary camera icon can be deleted from the window (S40).

As has been described above, generating and deleting a camera icon is realized by selecting appropriate means from the menu, and is also realized by D&D operation with a mouse.

Generating a camera icon is performed in the following manner. The camera generate icon 3150 (FIG. 24) is dragged and dropped (S43) in the map display area (map display window 3110) whereby opening the camera information dialogue box 720. The coordinates of a position where the camera icon is dropped are automatically inputted to the camera information dialogue box 720 as a camera icon position. Parameters other than the position are inputted in the camera information dialogue box 720 by an operator and the OK button is depressed. The camera information dialogue box 720 is closed and a new camera icon is generated.

Meanwhile, deleting a camera icon is performed in the following manner. If a camera icon (e.g. 3180 in FIG. 24) is dragged and dropped into the camera delete icon 3160 (S45), the camera data of the camera is deleted from the map and the camera icon is deleted from the map display area (map display window 3110) (S46).

The position of a camera icon or the direction of a pan head can be changed not only by using the camera information dialogue box 720 but also by D&D operation using a mouse.

The position of a camera icon (e.g. 3180 in FIG. 24) can be changed by dragging and dropping the icon in the map display area (map display window 3110). By this operation, camera data regarding a position of the camera can be changed (S48).

The direction of the pan head can be changed by D&D operation of the control pointer 800 displayed on the extended line 820 which is drawn in the direction of the camera icon. By this operation, camera data with respect to the direction of the pan head of the subject camera is changed (S50). The control pointer 800 can be moved along the circumference of a circle having a rotation axle 830 of a camera icon at its center.

Next, description will be provided in a case where a map is changed while editing a map file having a plurality of maps. A map tag (e.g. 3130 in FIG. 24) of the map to be changed is clicked with a mouse (S51). Map data for the map and camera data are described in the map display area by displaying camera icons superimposing on the bit map (S52). If the number of maps is too large and the width of the total map tags exceeds the width of the map display window, a tag scroll button 3200 is displayed on both sides of the map tags. By clicking the button 3200, it is possible to scroll the entire tags in the direction of the arrow of the button 3200.

When a map name or a map tag name is to be changed, or an unnecessary map is to be deleted, the following process is performed.

When a map name or a map tag name is to be changed, it is determined whether or not the map name/map tag name change means (the menu "CHANGE TAG NAME/MAP NAME" in the map menu 3170*b* in FIG. 19B) is selected by mouse click (S30). If it is selected, the map name dialogue box 700 is opened for the currently selected map, whereupon a map name and a map tag name are inputted, performing the change processing (S31). The menu "CHANGE TAG NAME/MAP NAME" in the map menu 3170*b* may be selected by double-clicking the map tag.

In addition, when an unnecessary map is to be deleted, it is determined whether or not the map delete means (the menu "DELETE MAP" in the map menu 3170*b* in FIG. 19B) is selected by mouse click (S32). If it is selected, the subject map data, camera data and map tag are deleted (S33).

Upon completing edit of the subject map file, the map file is stored, whereby generating an actual text file in the secondary storage. This processing is performed in the following manner.

It is determined whether or not the means (the menu "SAVE" in the file menu 3170*a* in FIG. 19A) for saving the edited map file is selected (S16). If it is selected, it is then determined whether or not a name is set for the current-editing map file (S17). If it is not set, a name is assigned to the current-open map file and saved, then editing is continued (S18). If a name has been already set for the current-editing map file, the edit is overwritten in the current-open map file and saved, then editing is continued (S19).

In a case where the edited map file is named and saved, it is determined whether or not the menu "SAVE AS" is selected from the file menu 3170*a* in FIG. 19A (S20). If it is selected, a name is assigned to the current-open map file and saved, then editing is continued (S18).

Upon completing edit of the subject map file, if an operator wishes to keep the map editor open but wishes to prevent erroneous change on the map, the map file is simply closed. This processing is performed in the following manner.

It is determined whether or not the menu "CLOSE" is selected from the file menu 3170*a* in FIG. 19A (S14). If it is selected, the map file is closed (S15). After closing the map file, operation cannot be performed except generating a new map file, opening a map file and exiting the map editor.

When all the operation is finished, the map editor is exited. This processing is performed in the following manner.

When a button 3210 for the map editor shown in FIG. 11 is clicked, a menu (not shown) including "MOVE" and "QUIT" is displayed. It is determined whether or not "QUIT" is selected from the menu (S23), and if it is selected, the map editor is quit (S24). Note that the same processing is performed by selecting "QUIT" from the file menu 3170*a* in FIG. 19A. At the time of quitting, the map editor saves, in an initial setting file, the condition of whether or not the map file is still subjected to editing, and the map file name. The initial setting file is referred to at the start-up of the map editor.

According to the present embodiment, edit of a map file can be easily realized by the above described map editor.

Note that the foregoing processing is performed by the CPU 22 on the basis of data stored in the main memory 24, utilizing programs (software) stored in the secondary storage 26.

<Modified Embodiment>

Figure 29:
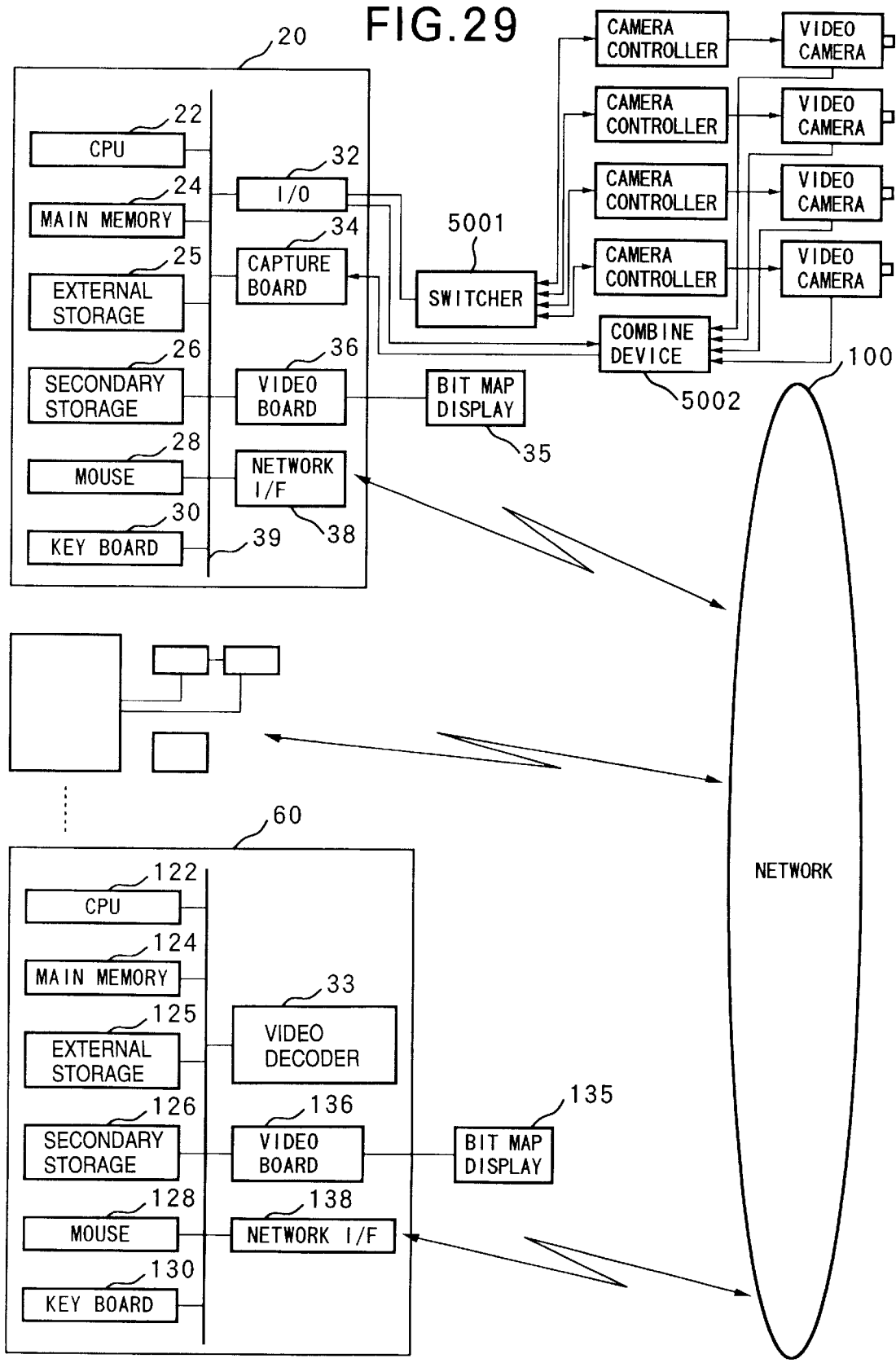
FIG. 29 is a block diagram of a system where the switcher and the combine device are connected to an image transmission terminal.

The modified embodiment provides an example of operation of the map editor in a case where, as shown in FIG. 29, a single image transmission terminal 20 is connected to an image signal switcher 5001 called "switcher" for switching RS signals and analog signals, and an apparatus 5002 called "combine device" which performs switching of four analog image signals sent by four different cameras and combining four screens. The modified embodiment enables to connect up to four video cameras. The display form of a selected camera icon in the modified embodiment is different from that of the foregoing embodiment. In addition, in the modified embodiment, more data can be inputted into the camera information dialogue box.

Figure 26:
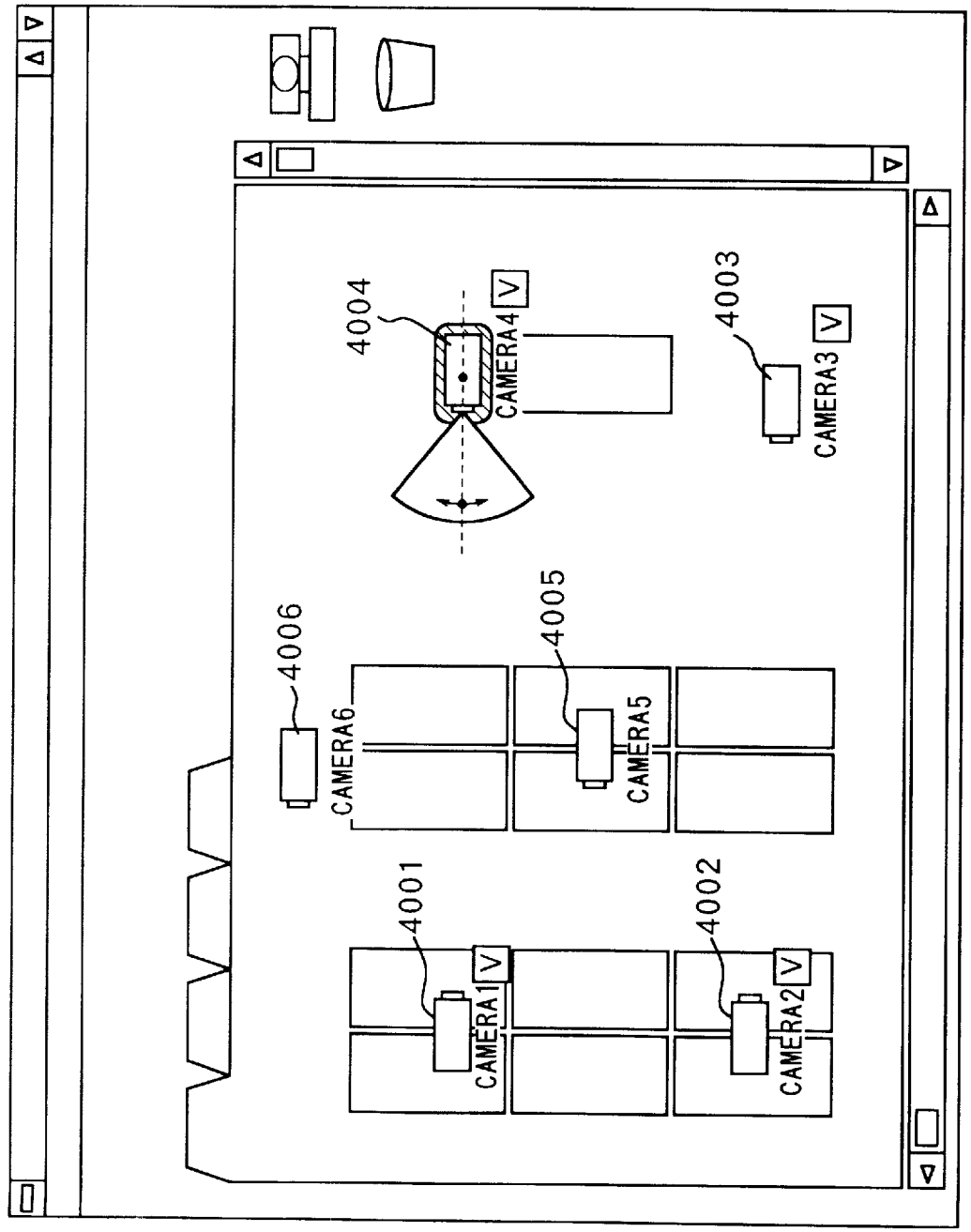
FIG. 26 shows an example of a display screen of a map editor where a camera icon, representing a camera connected to a switcher and a combine device, is selected.

FIG. 26 shows a condition where a camera icon, representing a video camera connected to the switcher 5001 and combine device 5002, is selected. Camera icons 4001, 4002, 4003 and 4004 represent video cameras connected to the same switcher and the combine device; and camera icons 4005 and 4006 represent video cameras connected to other image transmission terminals. The condition shown in FIG. 26 is the state immediately after the camera icon 4004 is clicked with a mouse.

As mentioned in the foregoing embodiment, a camera icon can be selected one at a time. The selected camera icon 4004 is displayed with an yellow frame. In the present embodiment, the mark "V" is displayed at the bottom right of the camera icon 4004, to indicate the connection with the switcher 5001 and combine device 5002. The camera icons 4001, 4002, and 4003 also have the same mark "V" below the icons, indicating that they are also connected with the same switcher and combine device.

Note that in accordance with an instruction sent by the CPU 22 via the I/O 32, the combine device 5002 combines images sensed by more than one designated cameras such that the images are as if sensed by a single camera, and outputs the combined image to the video capture board 34. For instance, in a case where an instruction is given to output an image sensed by a single camera only, the received image is directly outputted to the video capture board 34 without processing. In a case where an instruction is given to combine images sensed by four cameras, the received four images are respectively reduced to one quarter in the size, and all the four images are combined to generate one image having the size as large as the original image's size, then the image is outputted to the video capture board 34.

Although each of the images sent from respective cameras is small, it is possible to display the images sensed by four cameras, for instance, in the window 610 in FIG. 5. A technique to combine a plurality of images by the combine device and display the combined image in one display window is as follows. For instance, a plurality of camera icons having the "V" mark on the map are selected (e.g., by clicking an icon while depressing a shift key on the key board, additional selection of a camera icon is realized). Alternatively, while an image of one of the cameras connected to the combine device 5002 is displayed, an instruction is given, by utilizing combine instruct means, to the image transmission terminal 20 such that the combine device sends a combine instruction.

Figure 30:
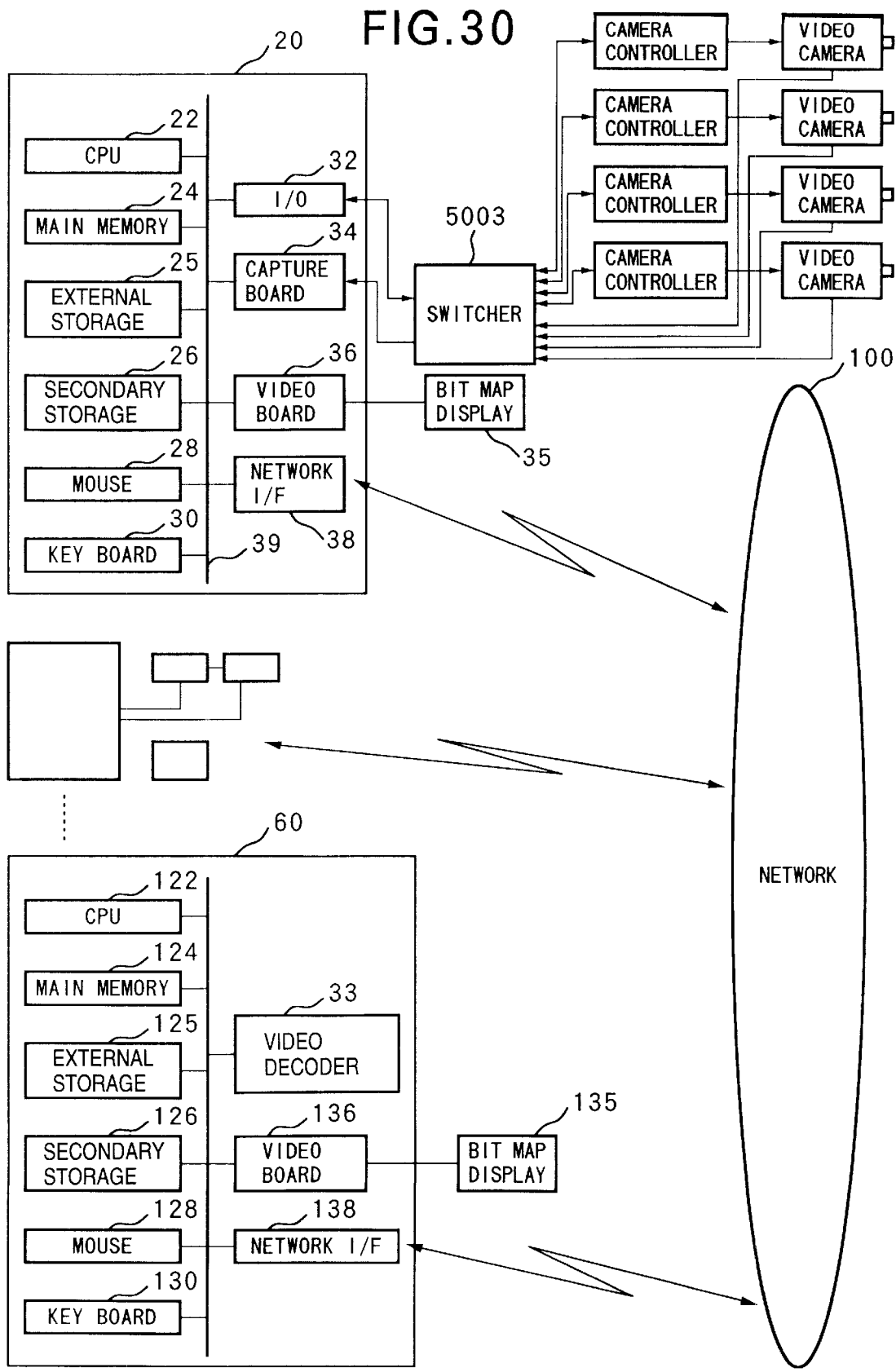
FIG. 30 is a block diagram of a system where the switcher is connected to the image transmission terminal.

Moreover, as shown in FIG. 30, the system may be constructed with a switcher 5003 only, without including the combine device. In this case, instead of combining images sensed by a plurality of cameras, one camera is selected and the sensed image is received and displayed.

The difference between the switcher 5003 in FIG. 30 and the switcher 5001 in FIG. 29 is in that, selection of a control subject camera is equivalent to selection of a camera whose image is to be captured in the switcher 5003, while it is not equivalent in the switcher 5001.

As a matter of course, the operation performed in the construction shown in FIG. 30 can be performed in the construction shown in FIG. 29, by sending a camera select instruction to the switcher 5001 and simultaneously sending the same instruction to the combine device 5002.

Figure 27:
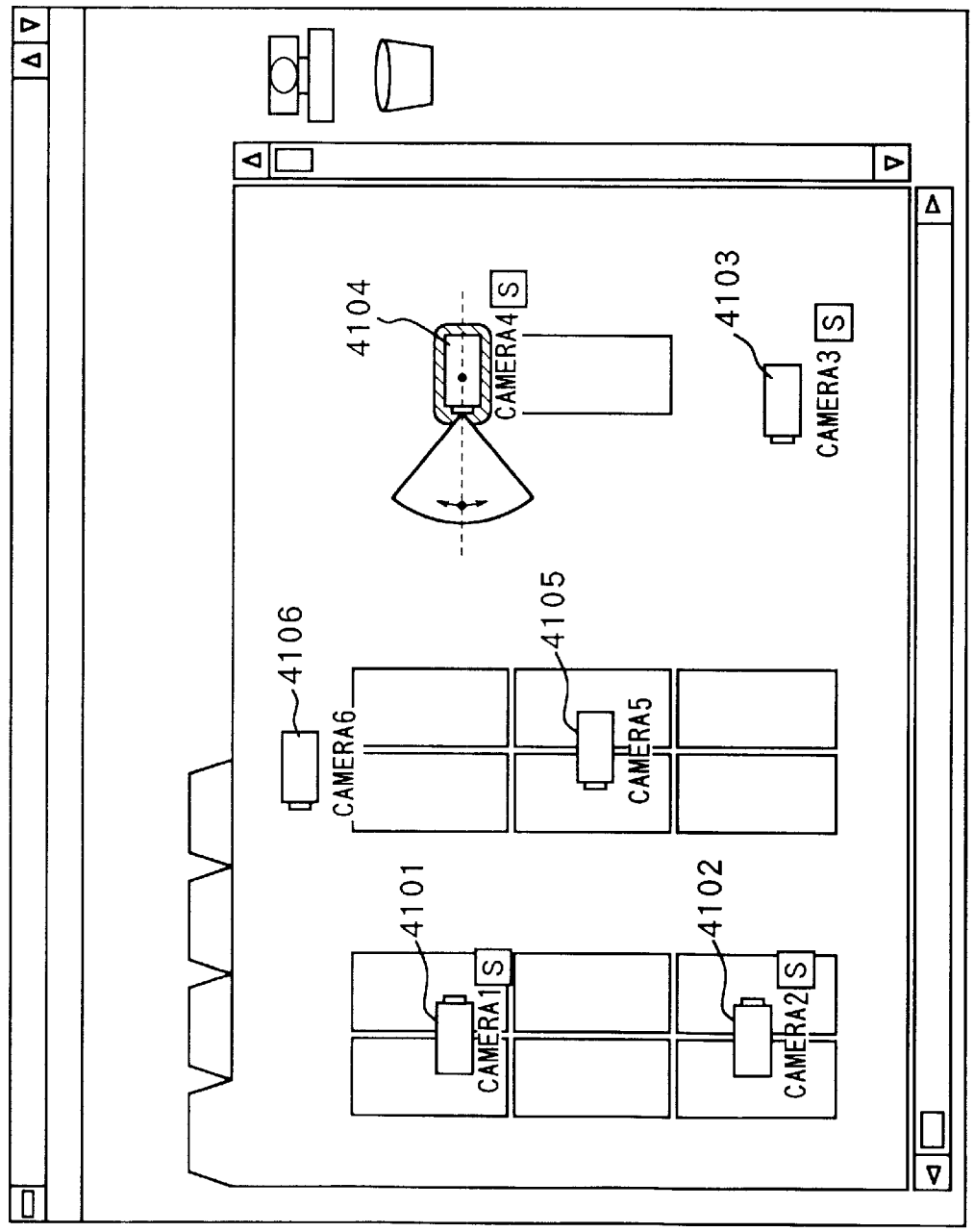
FIG. 27 shows an example of a display screen of a map editor where a camera icon, representing a camera connected to a switcher, is selected.

FIG. 27 shows a condition where a camera icon, representing the camera connected to the switcher 5003 only, is selected. Camera icons 4101, 4102, 4103 and 4104 represent cameras connected to the same switcher, and camera icons 4105 and 4106 represent cameras connected to other switchers. The condition shown in FIG. 27 is the state immediately after the camera icon 4104 being clicked with a mouse.

As similar to the state shown in FIG. 26, the selected camera icon 4104 is displayed with an yellow frame. At the same time, the mark "S," indicating that the camera is connected to the switcher, is displayed at the bottom right of the camera icon 4104. The camera icons 4104, 4102 and 4103 have the same mark "S" below the icons, indicating that they are also connected to the same switcher.

Figure 28:
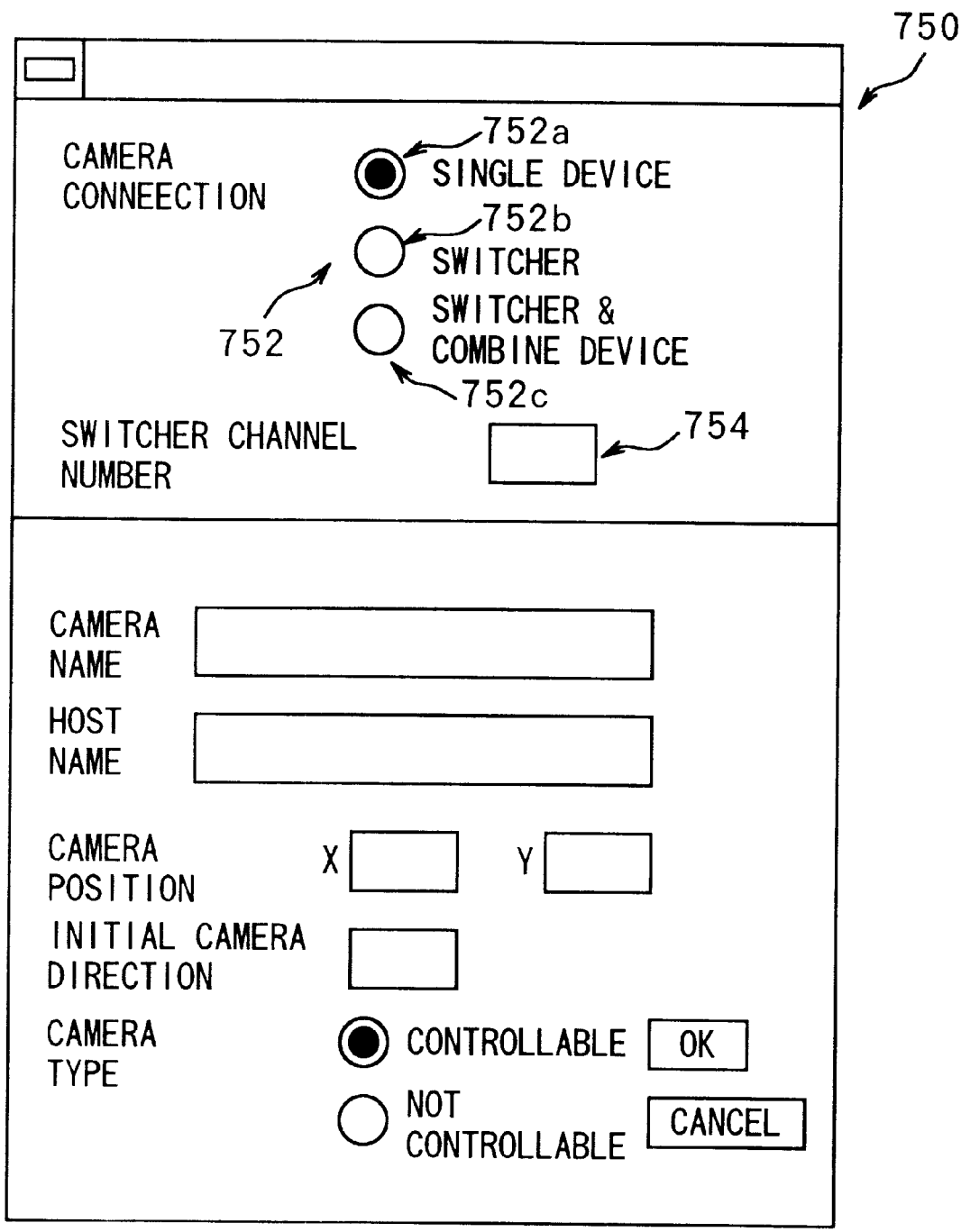
FIG. 28 shows an example of a display screen of a camera information dialogue box in the system where a camera is connected to a switcher and a combine device.

In the modified embodiment, it is preferable that the camera information dialogue box, used for inputting/changing camera data, be displayed in the form shown in FIG. 28, in consideration of the switcher and combine device. In the camera information dialogue box 750 shown in FIG. 28, radio buttons 752 (752a, 752b and 752c) and a switcher channel number dialogue box 754 are added to the camera information dialogue box 720 shown in FIG. 23. The radio buttons 752 specify a form of camera connection (single device, switcher, switcher and combine device), and the switcher channel number dialogue box 754 specifies a control I/O of the switcher to which the selected camera icon is connected. These data is referred when the camera control client 411 (FIG. 2) sends a camera control command to the camera control server 421, or when the map management software 413 displays a camera icon.

According to the above described modified embodiment, it is possible to easily edit a map file which is a text file, in a short period of time, in the manner of WYSIWYG.

A map file such as that shown in FIG. 31 can be generated by the above described modified embodiment.

The generated map file may be uploaded, e.g., to a file server on a network, so that it can be distributed to users at each monitoring terminal.

Thus, if a camera server, corresponding to the image transmission terminal of the present embodiment, is established in the Internet, and map files of e.g. famous sightseeing spots or the like are uploaded to an appropriate server (may be a camera server), it is possible for an end user to enjoy sightseeing by remotely operating the camera while viewing the map of the sightseeing spot.

As described above, according to the present invention, it is possible to provide an apparatus which can display camera arrangement on a map with easy operation.

Moreover, it is possible to provide an apparatus where operability of the displayed camera on the map is improved.

The present invention is not limited to the above embodiments and various changes and modifications can be made within the spirit and scope of the present invention. Therefore, to appraise the public of the scope of the present invention, the following claims are made.

What is claimed is:

1. A map edit apparatus for editing a map file comprising:
a display device that controls a display of a map, a camera symbol on the map corresponding to a camera set at a real position, and a control pointer at a position neighboring the displayed camera symbol, said control pointer being used for defining a sensing direction of said camera;
a setting device that turns said camera symbol by dragging said control pointer and sets the direction of said camera symbol as an initial sensing direction of said camera; and
a storing device that stores information about the map edited and the direction of said camera symbol as a map edit file.

2. The map edit apparatus according to claim 1, wherein said setting device sets a position of said camera symbol in accordance with an instruction of a predetermined pointing device.

3. The map edit apparatus according to claim 1, wherein said display device selects an image file used as a background to place a camera symbol reads image data from the selected image file superimposes on the camera symbol.

4. The map edit apparatus according to claim 1, wherein a plurality of areas where the camera symbols are arranged are displayed, and each of the areas includes a tab so that one of the areas can be selected.

5. A method of editing a map file, comprising the steps of:
displaying a map, a camera symbol on the map corresponding to a camera set at a real position, and a control pointer at a position neighboring the displayed camera symbol, said control pointer being used for defining a sensing direction of said camera;
turning said camera symbol by dragging said control pointer;
setting the direction of said camera symbol as an initial sensing direction of said camera; and
storing information about the map edited and the direction of said camera symbol as a map edit file.

6. A memory medium storing computer program codes for a map editor for editing a map file which is utilized by an apparatus, comprising:
program codes for displaying a map, a camera symbol on the map corresponding to a camera set at a real position, and a control pointer at a position neighboring the displayed camera symbol, said camera pointer being used for defining a sensing direction of said camera;
program codes for turning said camera symbol by dragging said control pointer;
program codes for setting the direction of said camera symbol as an initial sensing direction of said camera; and
program codes for storing information about the map edited and the direction of said camera symbol as a map edit file.

7. The map edit apparatus according to claim 1, further comprising an input device that reads a map, wherein said input device converts the read map to digital data, and said storing device stores the map data converted by said input device.

* * * * *